US007000707B2

(12) United States Patent  (10) Patent No.: US 7,000,707 B2
Oota  (45) Date of Patent: Feb. 21, 2006

(54) DIFFERENTIAL DEVICE

(75) Inventor: Yoshitaka Oota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/863,894

(22) Filed: Jun. 8, 2004

(65) Prior Publication Data

US 2004/0256120 A1    Dec. 23, 2004

(30) Foreign Application Priority Data

Jun. 13, 2003 (JP) .............................. 2003-169471

(51) Int. Cl.
*A01B 33/00* (2006.01)
(52) U.S. Cl. ........................................ 172/125; 192/43
(58) Field of Classification Search ................ 172/103, 172/125, 48, 49; 74/650; 192/114 T, 70.11, 192/43
See application file for complete search history.

(56) References Cited

U.S. PATENT DOCUMENTS

| | | | | |
|---|---|---|---|---|
| 2,458,089 A | * | 1/1949 | McFariane | 74/650 |
| 3,252,553 A | * | 5/1966 | Peterson | 192/48.4 |
| 4,352,418 A | * | 10/1982 | Teraoka | 192/36 |
| 4,373,407 A | * | 2/1983 | Okubo | 74/650 |
| 4,733,743 A | * | 3/1988 | Weiss et al. | 180/255 |
| 4,792,010 A | * | 12/1988 | Kitao et al. | 180/233 |
| 4,895,051 A | * | 1/1990 | Weiss et al. | 475/150 |
| 5,038,884 A | * | 8/1991 | Hamada et al. | 180/233 |
| 6,286,391 B1 | * | 9/2001 | Gassmann | 74/650 |
| 6,470,659 B1 | * | 10/2002 | Shimamura et al. | 56/14.7 |
| 6,722,445 B1 | * | 4/2004 | Ohta et al. | 172/42 |

FOREIGN PATENT DOCUMENTS

JP          08318745          12/1996

* cited by examiner

*Primary Examiner*—Victor Batson
(74) *Attorney, Agent, or Firm*—Adams & Wilks

(57) ABSTRACT

A differential device has a power-transmitting member mounted to undergo rotation in forward and reverse directions about a central rotational axis and to undergo linear movement in a direction along the central rotational axis. The power-transmitting member has meshing claws each having an inclined surface. A pair of driven shafts are mounted to undergo rotation about the central axis. A pair of rotational driven members have meshing claws confronting and for meshing engagement with the meshing claws of the power-transmitting member. When the power-transmitting member rotates to transmit rotational driving power to the driven members, force components acting on contacting surfaces of the meshing claws of the power-transmitting members and the driven members displace the driven members in an axial outward direction away from the power-transmitting member to define therebetween a space to allow axial movement of the power-transmitting member within the space.

10 Claims, 15 Drawing Sheets

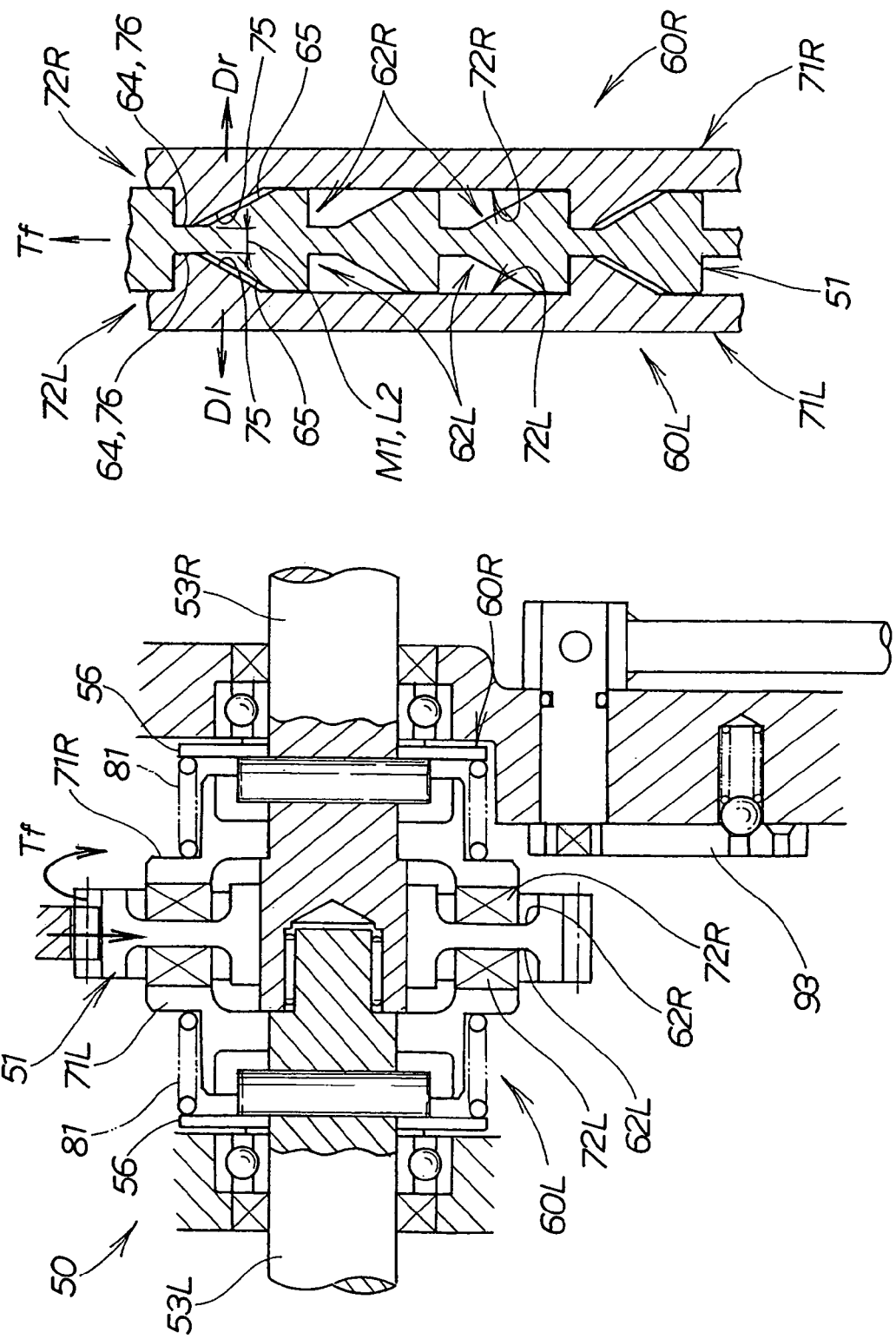

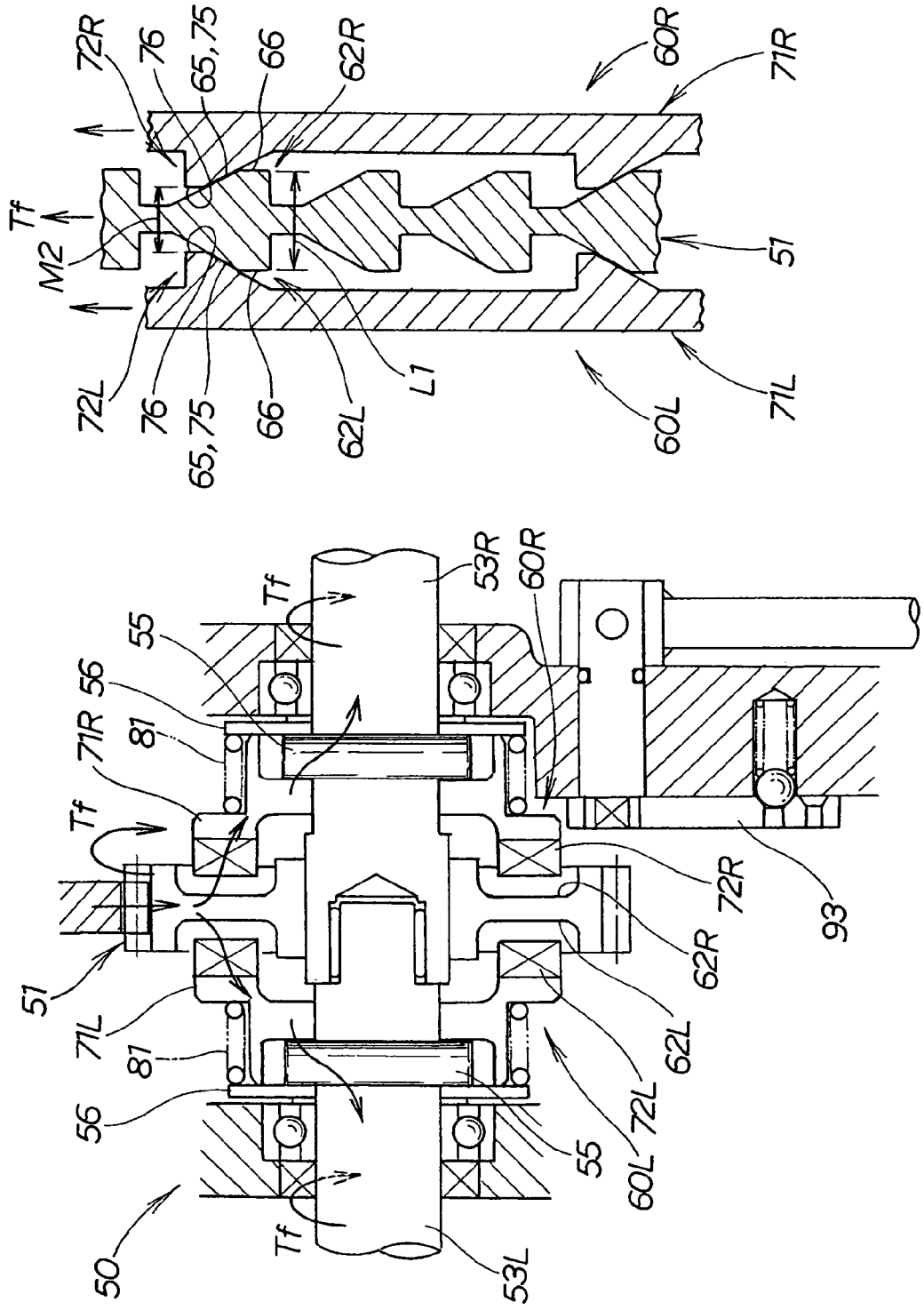

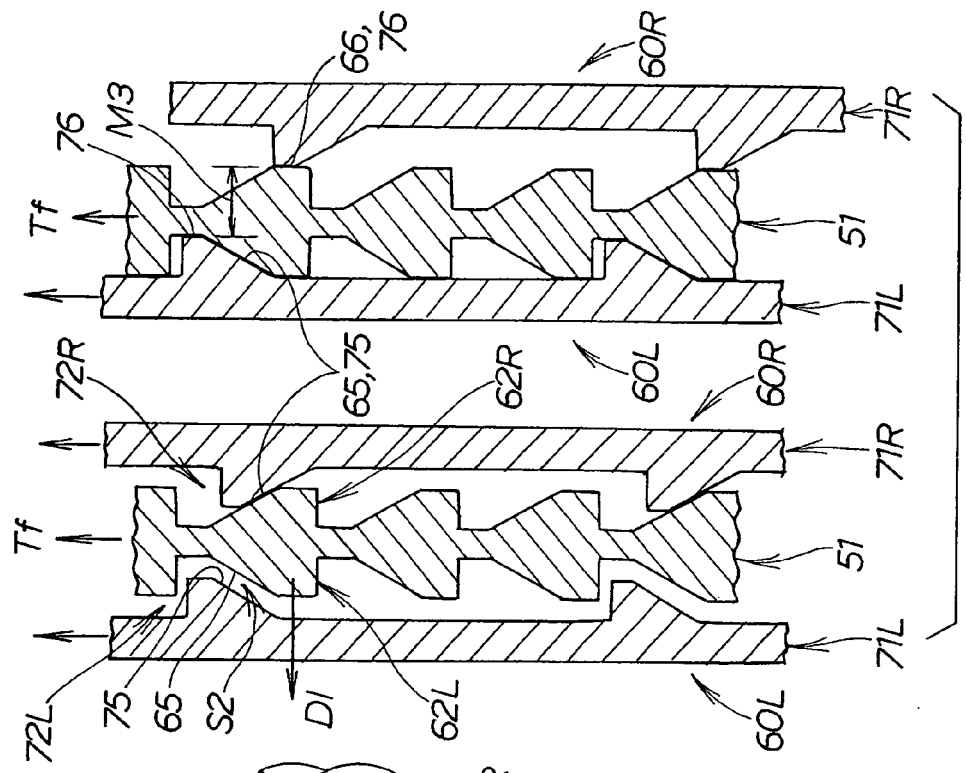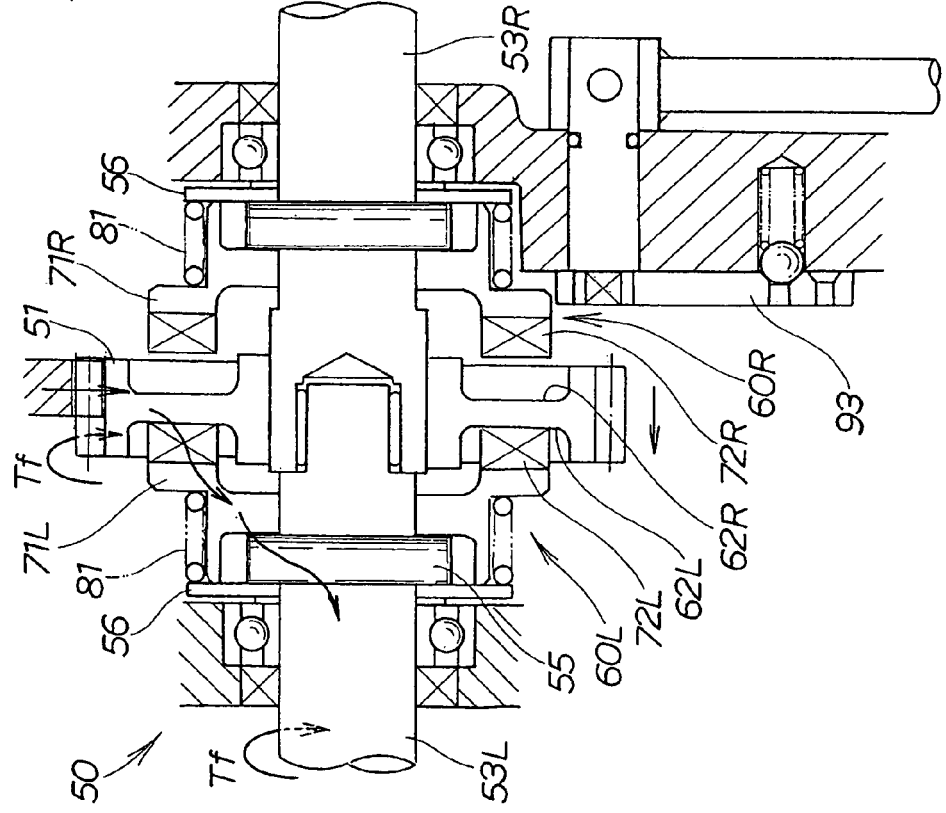
FIG. 11A
FIG. 11B

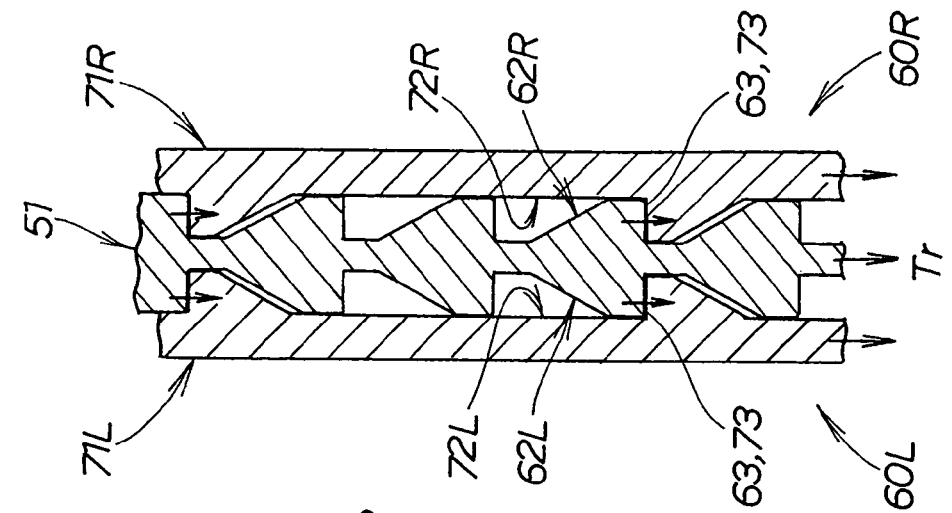
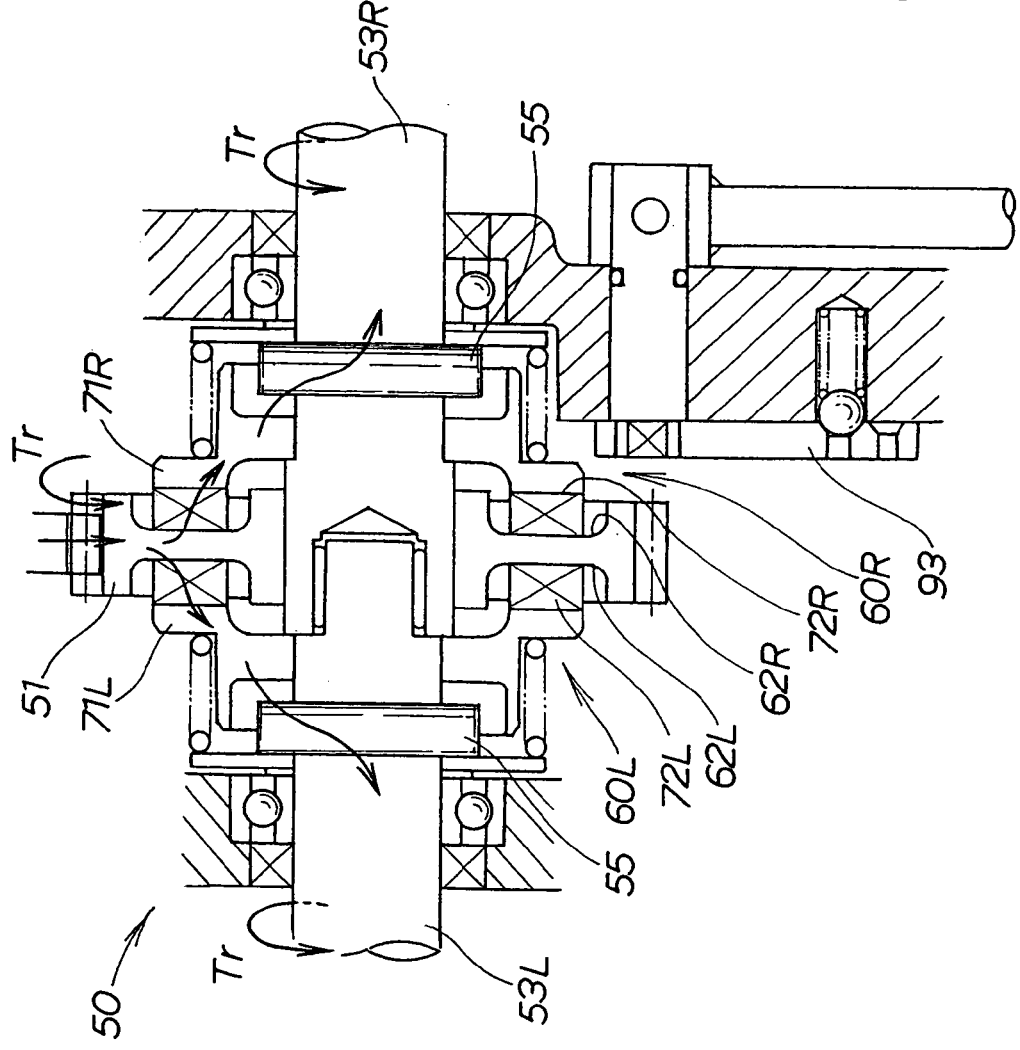

DIFFERENTIAL DEVICE

FIELD OF THE INVENTION

The present invention relates to an improvement in differential devices.

BACKGROUND OF THE INVENTION

Various types of differential devices are known which function to distribute driving power from a power-transmitting member to left and right driven shafts (see, for example, Japanese Patent Application Laid-Open Publication No. HEI-8-318745 (hereinafter referred to as a "related patent document").

FIG. 15 hereof is a sectional view of the conventional differential device for an agricultural working machine disclosed in the related patent document. In the disclosed differential device, a rotatable primary power-transmitting member 81 has an axial hole 81c in which are inserted respective one end portions of two, i.e. left and right, axles 4 (functioning as output shafts A) rotatable relative to each other about a rotational centerline (rotation axis) of the primary power-transmitting member 81. Thus, driving power is distributed from the primary power-transmitting member 81 to the left and right axles 4 via left and right engaging/disengaging mechanisms 8. The left and right engaging/disengaging mechanisms 8 include left and right secondary power-transmitting members 82 that are mounted on the left and right axles 4, respectively, in opposed relation to opposite axial end surfaces (circumferential recessed end surfaces) 81b of the primary power-transmitting member 81. The primary power-transmitting member 81 also has three horizontally-elongated through-holes 81a formed at predetermined circumferential intervals, in each of which is accommodated two axially-opposed power-transmitting balls 80, resiliently biased away from each other in the axial direction by means of a coil spring 80a with a regulating pin 80b interposed therebetween. Each of the secondary power-transmitting members 82 has ball-engaging grooves 82a each provided for holding one of the balls 80. Reference numeral 29T represents a sprocket integrally formed on the primary power-transmitting member 81, 82b a washer, and 82c a retaining ring.

When a load acting one either one of the axles 4 has exceeded a predetermined value, the corresponding balls 80 associated with the axle 4 are displaced from their engaged positions in the respective engaging grooves 82a to their released positions, to thereby automatically cut off the power transmission from the primary power-transmitting member 81 to the axle 4. With such a differential device, the working machine can be appropriately turned to any desired direction by a human operator only operating the machine so that a traveling resistance to the inner wheel, located at an inner side of a turning track, (i.e., the left wheel when the vehicle is turning left, or the right wheel when the vehicle is turning right) becomes greater than a predetermined value; as a consequence, it is possible to eliminate a need for the human operator to manipulate any particular lever.

However, because the engaging/disengaging mechanism 8, employed in the agricultural working machine disclosed in the related patent document, is arranged to automatically cut off the power transmission to the axle 4 once the traveling resistance to the corresponding wheel has exceeded the predetermined value, there is a possibility of the engaging/disengaging mechanism 8 being automatically activated at a time unintended by the human operator, and thus a further improvement has to be made to ensure satisfactory traveling performance of the working machine.

SUMMARY OF THE INVENTION

In view of the foregoing prior art problems, it is an object of the present invention to provide an improved differential device which can achieve sufficient performance for distributing driving power from a power-transmitting member to left and right driven shafts irrespective of whether the power-transmitting member is rotating in a forward direction or in a reverse direction, and which is yet simple in construction.

In order to accomplish the above-mentioned object, the present invention provides a differential device, which comprises: a power-transmitting member rotatable in forward and reverse directions and having left and right meshing claws formed on left and right surfaces thereof, left and right driven shafts having respective one axial end portions inserted in the power-transmitting member in opposed relation to each other and rotatable relative to each other about a rotational centerline of the power-transmitting member, the power-transmitting member being movable in an axial direction of the left and right driven shafts; and left and right driven members mounted on the left and right driven shafts, respectively, in such a way as to sandwich therebetween the left and right surfaces of the power-transmitting member and axially movable along the left and right driven shafts over a predetermined distance toward and away from the surfaces of the power-transmitting member, the left and right driven members having left and right meshing claws formed on respective one surfaces thereof, opposed to the left and right surfaces of the power-transmitting member, for meshing engagement with the left and right meshing claws of the power-transmitting member so that driving power is distributed from the power-transmitting member to the left and right driven shafts by rotation of the power-transmitting member, the left and right driven members being normally resiliently urged toward the surfaces of the power-transmitting member. The left and right meshing claws of the power-transmitting member and the left and right meshing claws of the driven members are arranged to meshingly engage/disengage with/from each other through engagement at their respective inclined surfaces in such a manner that, 1) during forward rotation of the power-transmitting member, either the meshing engagement between the left meshing claws of the power-transmitting member and the left driven member or the meshing engagement between the right meshing claws of the power-transmitting member and the right driven member is cancelled when a difference between loads acting on the meshing engagement between the left meshing claws and acting on the meshing engagement between the right meshing claws has exceeded a predetermined reference value, and 2) during reverse rotation of the power-transmitting member, both the meshing engagement between the left meshing claws and the meshing engagement between the right meshing claws are constantly maintained.

The differential device of the present invention further comprises a claw control mechanism (or differential-operation restricting mechanism) for compulsorily keeping the meshing engagement between the left meshing claws and between the right meshing claws by restricting the retreat of either or both of the left and right driven members from the corresponding end surface(s) of the power-transmitting member.

According to the present invention, when the power-transmitting member rotates in the forward direction, the left and right meshing claws formed on the opposite surfaces of the transmitting member and the left and right meshing claws formed on the left and right driven members mesh with each other, so that the driving power can be distributed from the transmitting member to the left and right driven shafts. Once the difference between the load acting on the meshing engagement between the left meshing claws and the load acting on the meshing engagement between the right meshing claws has exceeded the reference value during the forward rotation of the power-transmitting member, either the meshing engagement between the left meshing claws or the meshing engagement between the right meshing claws is cancelled. Thus, in a case where the differential device of the present invention is employed in a working machine or vehicle, the working machine or vehicle can be turned with ease by a human operator merely performing simple turning operation such that load unbalance (load difference) exceeding the reference value is produced between the left and right driven members.

When the power-transmitting member rotates in the reverse direction, on the other hand, the meshing engagement is constantly maintained between the left meshing claws and between the right meshing claws, so that, even when load unbalance has been produced between the left and right driven member during the reverse rotation, the driving power can be distributed from the transmitting member to the left and right driven shafts and thus the differential device can achieve sufficient performance for delivering the power from the power-transmitting member to the left and right driven shafts.

Further, with the claw control mechanism compulsorily keeping the meshing engagement between the left meshing claws and between the right meshing claws by restricting the retreat of either or both of the left and right driven members from the corresponding end surface(s) of the power-transmitting member, the present invention can reliably achieve sufficient performance for delivering the power from the power-transmitting member to the left and right driven shafts even when load unbalance has been produced between the left and right driven members.

Thus, irrespective of whether the power-transmitting member is rotated in the forward direction or in the reverse direction, the differential device of the present invention can achieve sufficient performance for delivering the power from the power-transmitting member to the left and right driven shafts, with simple construction. Therefore, for both of the forward and reverse rotations of the power-transmitting member, the differential device of the invention can achieve sufficient traveling performance of the working machine or vehicle which is provided with that differential device. As a result, particularly advantageous results can be attained in cases where the differential device of the invention is employed in a working machine or vehicle which is not be turned while traveling rearward, because of the simple construction of the differential device of the invention.

In one preferred implementation, each of the meshing claws, formed on the power-transmitting member and the left and right driven members, has an abutting surface extending parallel to the rotational centerline of the power-transmitting member so as to allow the meshing engagement between the left meshing claws and the meshing engagement between the right meshing claws to be constantly maintained during the reverse rotation of the power-transmitting member, and an inclined surface extending integrally from the abutting surface and inclined, along the direction of the rotation of the power-transmitting member, relative to the abutting surfaces of other meshing claws with which the meshing claw is to be meshed during the forward rotation of the power-transmitting member. With the meshing claws thus constructed, the differential device of the invention can be significantly simplified in construction with a reduced number of its component parts.

BRIEF DESCRIPTION OF THE DRAWINGS

Certain preferred embodiments of the present invention will hereinafter be described in detail, by way of example only, with reference to the accompanying drawings, in which:

FIGS. 9A and 9B are a first set of views explanatory of behavior of the differential device of the present invention;

FIGS. 10A and 10B are a second set of views explanatory of the behavior of the differential device of the present invention;

FIGS. 11A and 11B are a third set of views explanatory of the behavior of the differential device of the present invention;

FIGS. 12A and 12B are a fourth set of views explanatory of the behavior of the differential device;

DETAILED DESCRIPTION OF THE PREFERRED EMBODIMENTS

The differential device of the present invention will be described hereinbelow as applied to a self-propelled, walk-behind working machine. It should be noted that the terms "front", "rear", "left", "right", "upper", "lower", etc. used herein represent various directions as viewed by a human operator operating the working machine.

Figure 1:
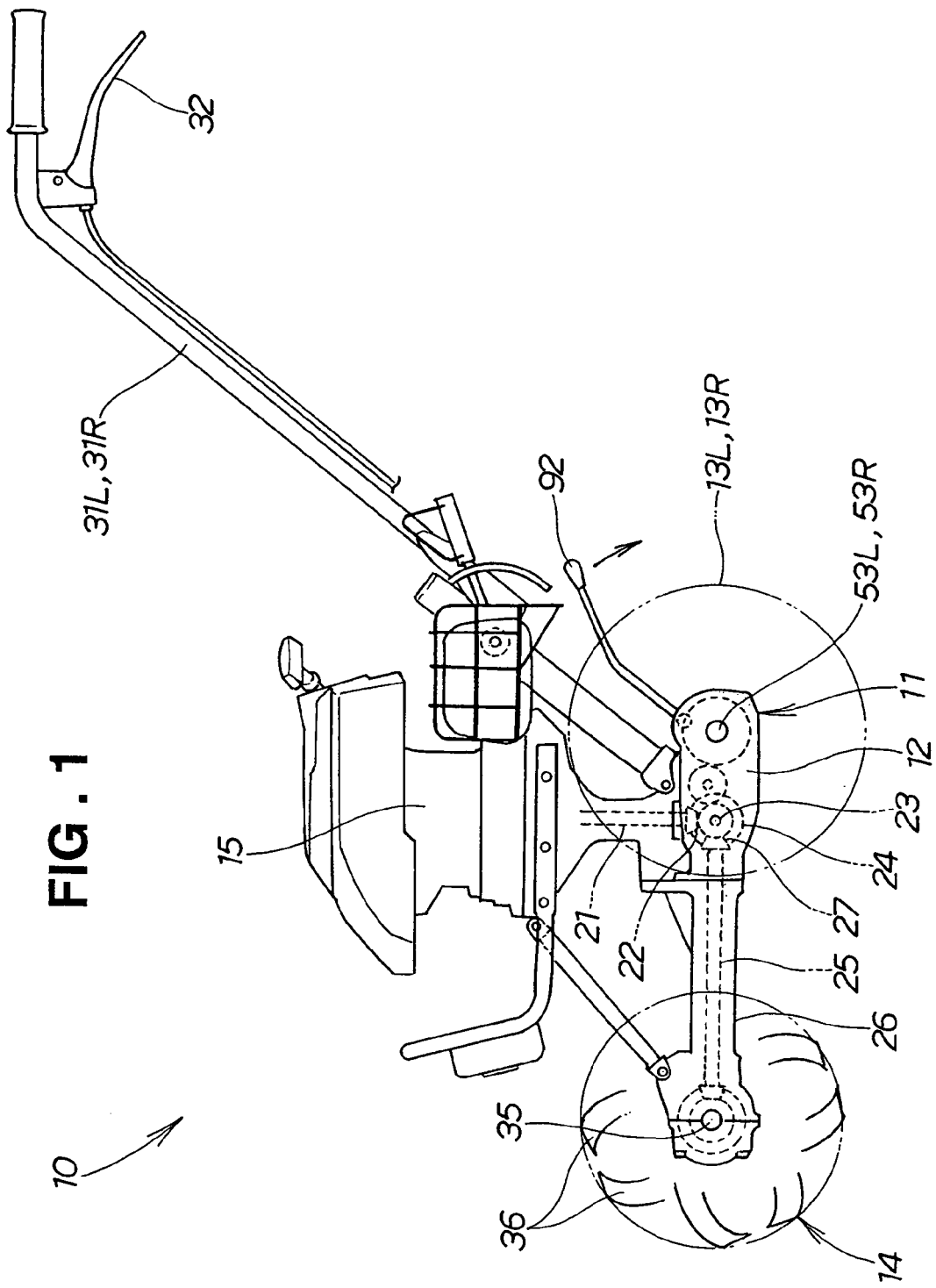
FIG. 1 is a left side view of a front-rotary working machine employing a differential device in accordance with an embodiment of the present invention.

FIG. 1 is a left side view of the working machine 10 employing the differential device in accordance with an embodiment of the present invention. The working machine 10, which is of a front-rotary type, includes left and right traveling wheels 13L and 13R connected to a rear portion of a transmission case 12 constituting a machine body, and a rotary working unit 14 connected to a front portion of the transmission case 12. In the illustrated example, the working machine 10 is a small-size self-propelled, walk-behind type cultivating machine where the traveling wheels 13L and 13R and rotary working unit 14 are driven by an engine 15 mounted on an upper portion of the transmission case 12.

Specifically, in the illustrated example of FIG. 1, a transmission (device) 11 is positioned beneath the engine 15 via a main clutch (not shown), and front and rear output shafts 23, 53L and 53R extend from front and rear portions of the transmission case 12. The rotary working unit 14 is driven via the front output shaft (rotary-side shaft) 23, while the traveling wheels 13L and 13R are driven via the rear output or driven shafts (axles) 53L and 53R.

The engine 15, which is a drive source of the working machine 10, is a vertical engine having a crankshaft extending in a substantial vertical direction. Input shaft 21 of the transmission 11 is a substantially-vertical shaft connected via the main clutch to the crankshaft.

Driving power can be transmitted from the input shaft 21 to the rotary-side shaft 23 through meshing engagement between a driving bevel gear 22 mounted at a lower end portion of the input shaft 21 and a first driven bevel gear 24 mounted on the rotary-side shaft 23.

Further, in the working machine 10, the rotary-side shaft 23 and the rotary working unit 14 are interconnected via a transmission shaft 25 that is enclosed with a cylindrical case 26, and the cylindrical case 26 is attached to the transmission case 12. Left and right operating handles 31L and 31R extend rearwardly and upwardly from a rear portion of the transmission case 12, and a clutch lever 32 for manipulating the main clutch is provided on the left operating handle 31L. The transmission 11 includes a control lever 92 extending rearwardly and upwardly.

Figure 2:
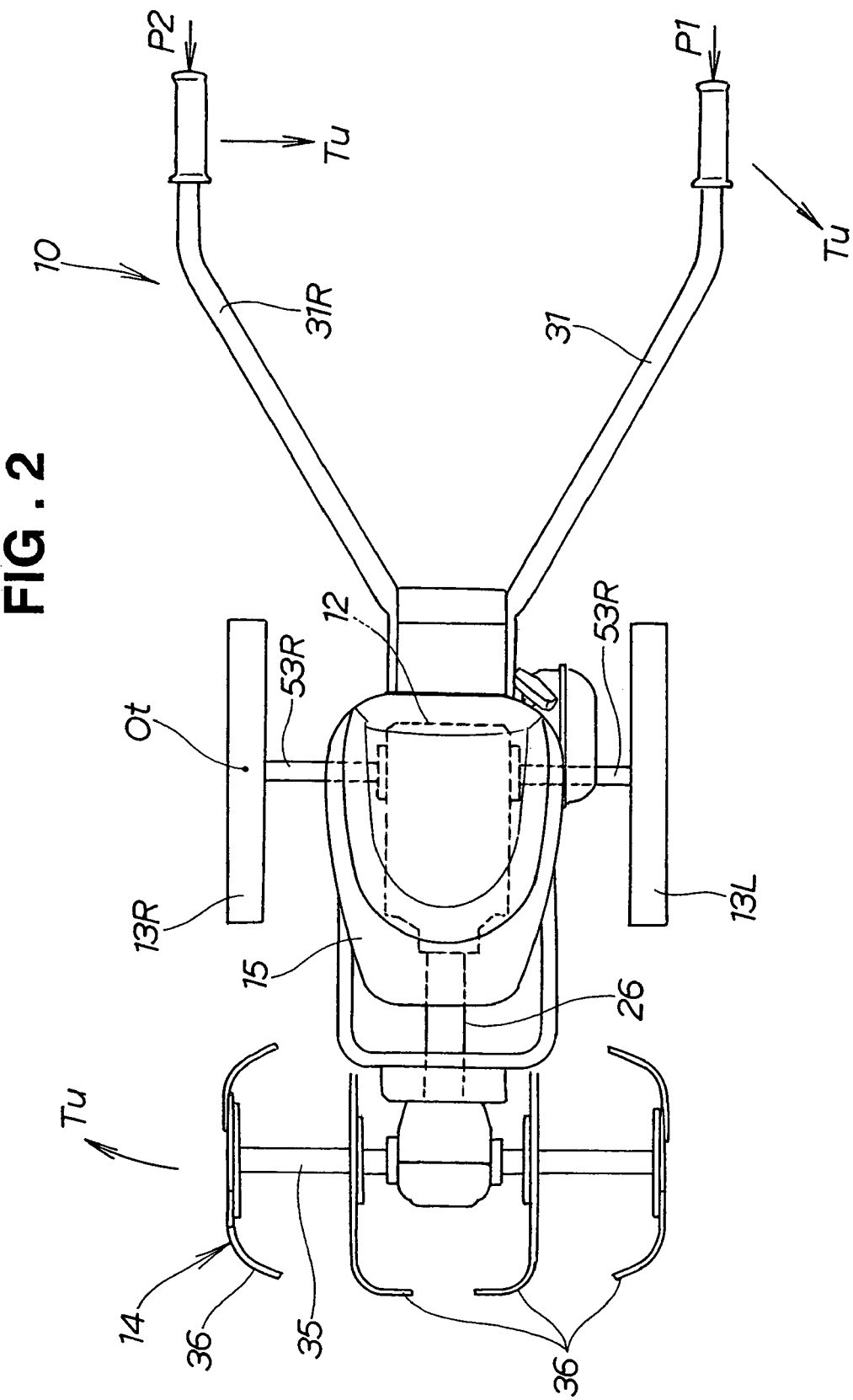
FIG. 2 is a top plan view of the front-rotary working machine employing the differential device of the present invention.

FIG. 2 is a plan view of the front-rotary working machine 10 employing the differential device of the present invention, which particularly shows the traveling wheels 13L and 13R secured to the left and right axles 53L and 53R extending horizontally from the transmission case 12 and also shows a plurality of cultivating claws 36 secured to a cultivating shaft 35 of the rotary working unit 14.

Figure 3:
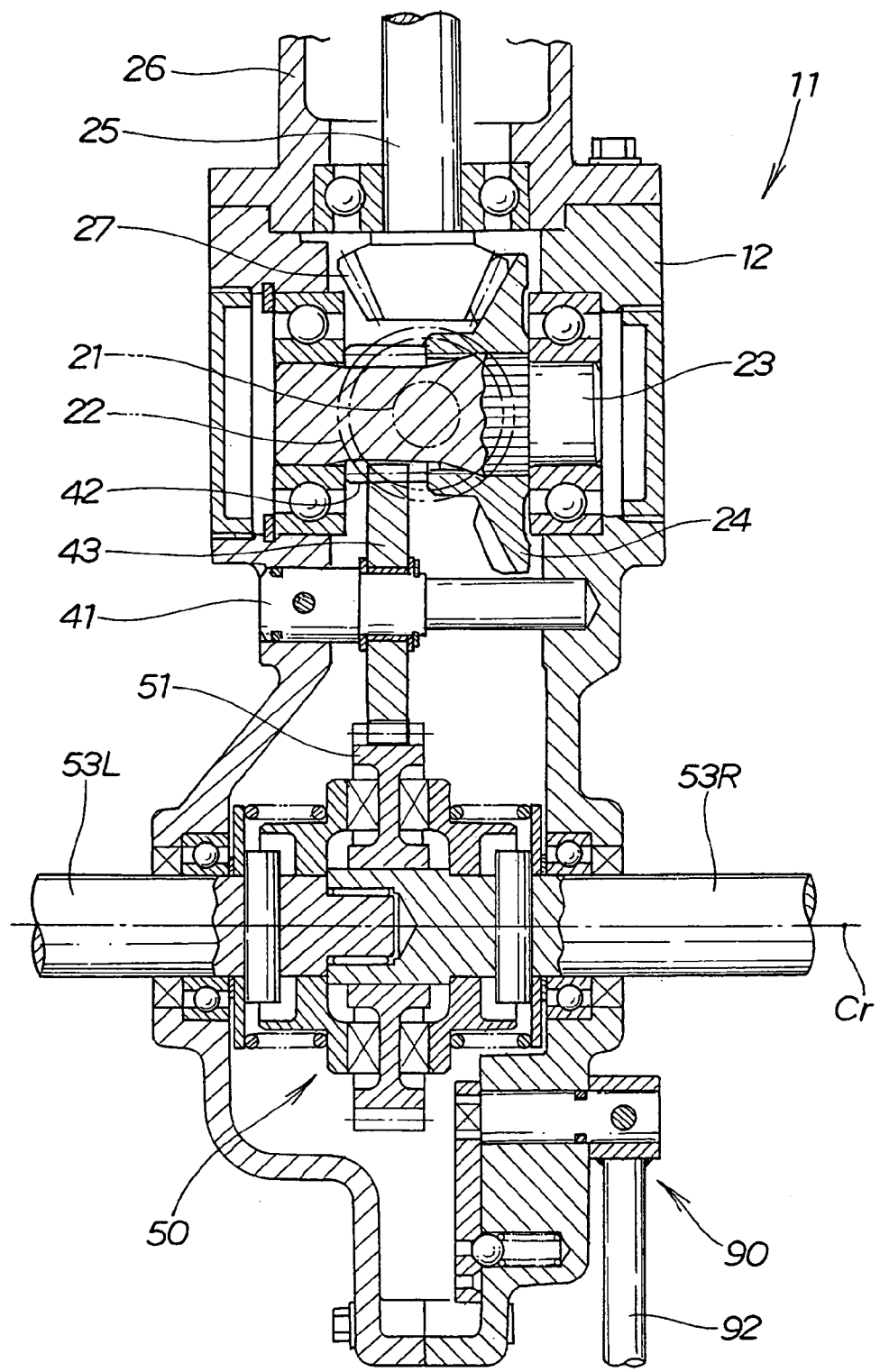
FIG. 3 is a sectional top plan view of a transmission in the working machine.

FIG. 3 is a sectional top plan view of the transmission 11, which includes the rotary-side shaft 23, intermediate shaft 41 and axles (i.e., left and right driven shafts) 53L and 53R that are arranged sequentially in a front-to-rear direction in the order of mentioning and that extend horizontally in a widthwise direction of the machine body. These shafts 23, 41, 53L and 53R are interconnected via gear mechanisms, and the transmission case 12 is, for example, dividable into left and right case haves.

Driving power can be transmitted from the rotary-side shaft 23 to the transmission shaft 25 through meshing engagement between the first driven bevel gear 24 mounted on the rotary-side shaft 23 and a second driven bevel gear 27 mounted on the transmission shaft 25.

First gear 42 is formed on the rotary-side shaft 23 and a second gear 43 is rotatably mounted on the intermediate shaft 41, so that driving power can be transmitted from the rotary-side shaft 23, via the first and second gears 42 and 43, to a third gear 51. The driving power can be transmitted from the third gear 51 to the left and right axles 53L and 53R via the differential device 50. The above-mentioned first to third gears 42, 43 and 51 are each in the form of a spur gear.

The third gear 51 functions as a part of the differential device 50; namely, the third gear 51 is a power-transmitting member of the differential device 50 for transmitting the driving power to the left and right axles 53L and 53R. Hereinafter, the third gear 51 will be referred to as "power-transmitting member 51" as necessary when described in relation to the differential device 50. The following paragraphs detail the differential device 50.

Figure 4:
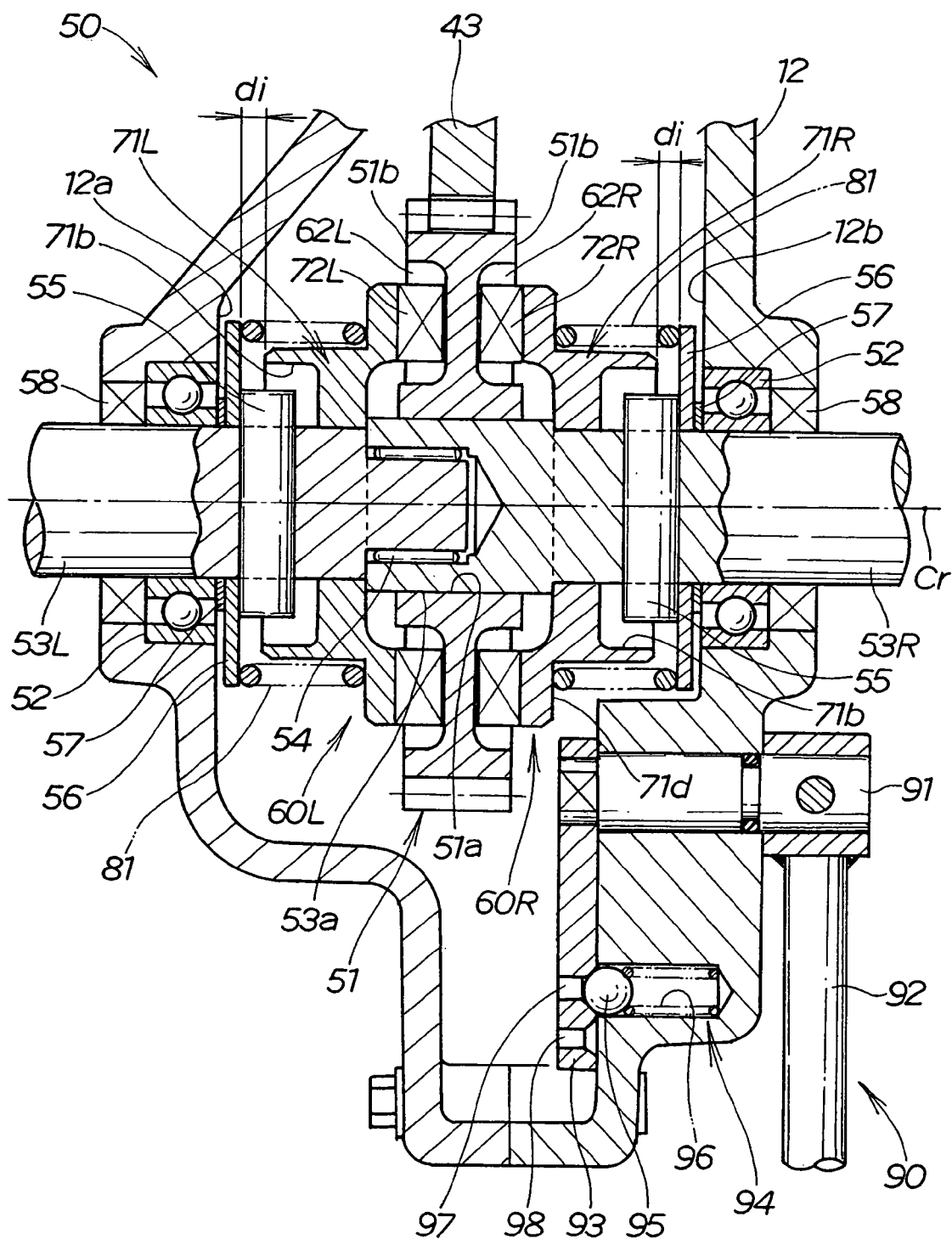
FIG. 4 is a sectional view of the differential device of the present invention.

FIG. 4 is a sectional view showing the differential device 50 in corresponding relation to FIG. 3.

The power-transmitting member 51, in the form of the third gear 3, is a cylindrical member rotatable about and linearly movable along its rotational centerline Cr, and it has an interior space (i.e., through-hole) 51a having the above-mentioned rotational centerline Cr as its axial centerline.

In the differential device 50, respective one end portions of the left and right axles (driven shafts) 53L and 53R, rotatable relative to each other about the rotational centerline Cr of the power-transmitting member 51, are positioned in the interior space 51a of the power-transmitting member 51 in axially-opposed relation to each other, and the driving power is distributed from the power-transmitting member 51 to the left and right axles 53L and 53R via corresponding left and right engaging/disengaging mechanisms 60L and 60R. The differential device 50 also includes a claw control (i.e., claw engaging/disengaging) mechanism 90. Note that the left and right axles 53L and 53R will be referred to as "left and right driven shafts 53L and 53R" as necessary when explained in relation to the differential device 50.

The transmission case 12 rotatably supports the left and right driven shafts 53L and 53R via bearings 52. The respective one end portions of the left and right driven shafts 53L and 53R are axially opposed to and fitted with each other via central bearings 54 in such a manner that the shafts 53L and 53R are rotatable relative to each other.

Pins 55 intersecting the rotational centerline Cr are inserted through the respective one end portions of the left and right driven shafts 53L and 53R. These pins 55 are abutted against inner wall surfaces 12a and 12b of the transmission case 12 via corresponding spring-biased plates 56 and flat washers 57, so that axial movement of the left and right driven shafts 53L and 53R along the rotational centerline Cr is limited within a predetermined range. However, the provision of the spring-biased plates 56 and flat washers 57 is not necessarily essential.

The power-transmitting member 51 is rotatable and axially movable relative to the left and right driven shafts 53L and 53R. Specifically, the right driven shaft 53R has a larger-diameter portion 53a at the one end portion, which is greater in diameter than the remaining portion of the right driven shaft 53R and the left driven shaft 53L. The power-transmitting member 51 is mounted on the larger-diameter portion 53a in such a manner that it is rotatable and axially movable relative to the left and right driven shafts 53L and 53R. In the figure, reference numeral 58 represents an oil seal.

Figure 5:
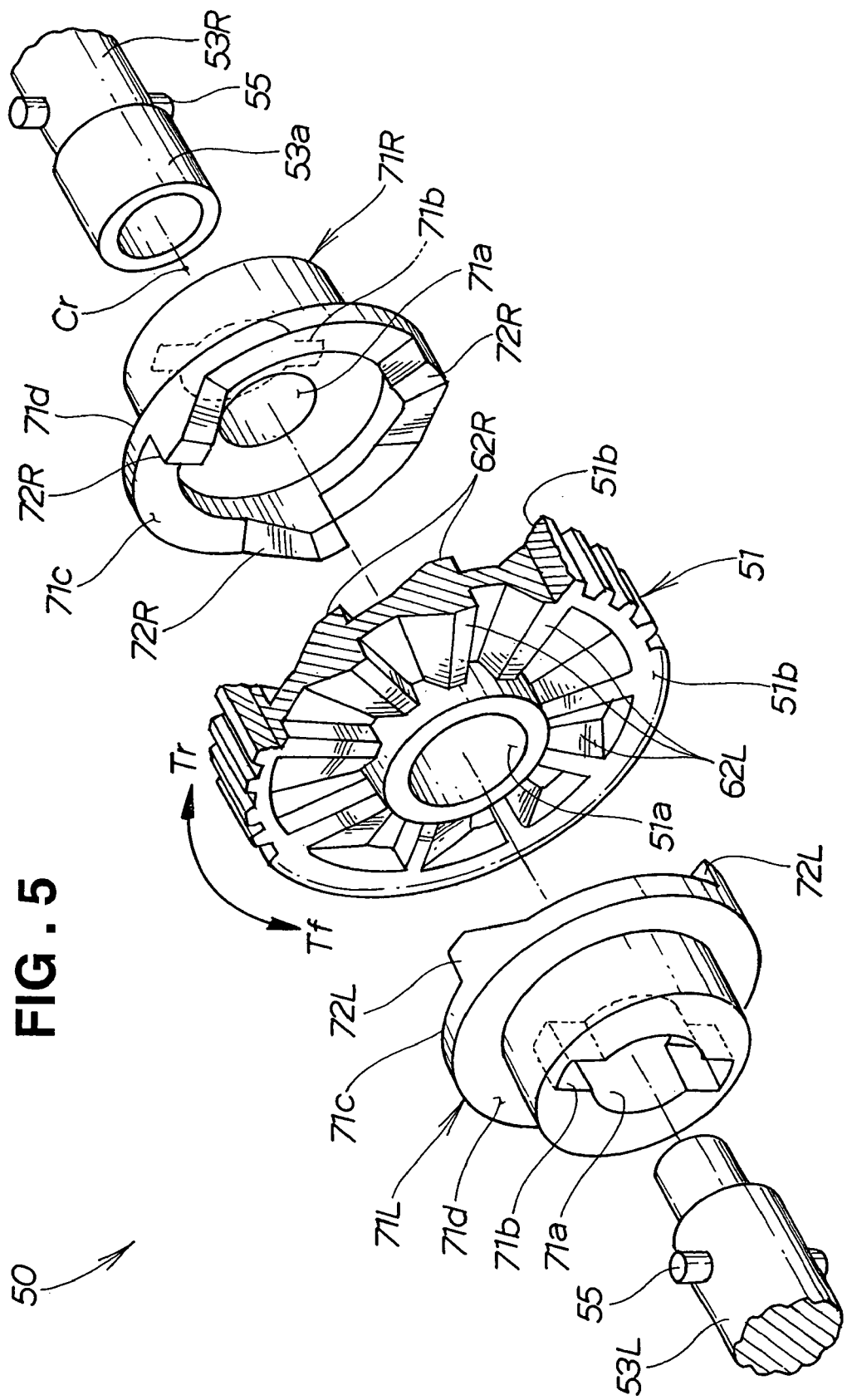
FIG. 5 is an exploded perspective view of the differential device of the present invention.

FIG. 5 is an exploded perspective view of the differential device 50 of the invention. Detailed structure of the differential device 50 will be described below with reference to FIGS. 5 and 4.

The left and right engaging/disengaging mechanisms 60L and 60R (see FIG. 4) include a plurality of left and right meshing claws 62L and 62R formed on opposite axial end surfaces 51b (left and right end surfaces in FIG. 5) of the power-transmitting member 51, and left and light driven members 71L and 71R sandwiching therebetween the left and right end surfaces 51b of the power-transmitting member 51. The left and right engaging/disengaging mechanisms 60L and 60R also include a plurality of left and right meshing claws 72L and 72R, respectively; namely, the left meshing claws 72L are formed on the left driven member 71L while the right meshing claws 72R are formed on the right driven member 71R. The left and right engaging/disengaging mechanisms 60L and 60R also include resilient members 81 (FIG. 4) resiliently urging the corresponding driven members 71L and 71R against the corresponding end surfaces 51b of the power-transmitting member 51.

The left driven member 71L has a through-hole portion 71a in which is fitted one end portion of the left driven shaft 53L, and diametrically-opposed engaging grooves 71b formed in the through-hole portion 71a in a direction intersecting the rotational centerline Cr.

With the left driven shaft 53L fitted in the through-hole portion 71a and the pin 55 fitted in the engaging grooves 71b, the left driven member 71L is mounted on the left driven shaft 53L for limited axial movement.

Similarly, the right driven member 71R has a through-hole portion 71a in which is fitted one end portion of the right driven shaft 53R, and diametrically-opposed engaging grooves 71b formed in the through-hole portion 71a in a direction intersecting the rotational centerline Cr.

With the right driven shaft 53R fitted in the through-hole portion 71a and the pin 55 fitted in the engaging grooves 71b, the right driven member 71R is mounted on the right driven shaft 53R for limited axial movement.

The plurality of left and right meshing claws 62L and 62R, formed on the opposite axial end surfaces 51b of the power-transmitting member 51 (e.g., nine meshing claws 62L, 62R on each of the end surfaces), extend radially outward from a near-center portion of the power-transmitting member 51 at equal circumferential intervals and connect with each other via an outer circumferential portion of the member 51.

The left driven member 71L has a plurality of (e.g., three) left meshing claws 72L on its end surface 71c opposed to the left end surface 51b of the power-transmitting member 51, and similarly the right driven member 71R has a plurality of (e.g., three) right meshing claws 72R on its end surface 71c opposed to the right surface 51b of the power-transmitting member 51. These meshing claws 72L or 72R on each of the driven members 71L or 71R are located at equal circumferential intervals and connect with each other via an outer circumferential portion of the driven member 71L or 71R.

Namely, the meshing claws 62L, 72L and 62R, 72R are formed on the opposed surfaces 51b and 71c of the power-transmitting member 51 and the left and right driven members 71L and 71R.

Rotation of the power-transmitting member 51 in a counterclockwise direction of FIG. 5 (which corresponds to a forward travel direction Fr of the working machine 10 in FIG. 1) will hereinafter be called "forward rotation Tf", and the direction of the forward rotation will be called "forward rotation direction Tf". Also, rotation of the power-transmitting member 51 in a clockwise direction of FIG. 5 (which corresponds to a rearward travel direction Rr of the working machine 10 in FIG. 1) will hereinafter be called "reverse rotation Tr", and the direction of the reverse rotation will be called "reverse rotation direction Tr".

Referring back to FIG. 4, the differential device 50 includes the left resilient member 81 between the spring-biased plate 56 secured to the left inner wall surface 12a of the transmission case 12 and the left driven member 71L, and the right resilient member 81 between the spring-biased plate 56 secured to the right inner wall surface 12b of the transmission case 12 and the right driven member 71R. For example, these resilient members 81 are compression coil springs.

The left driven member 71L is resiliently urged via the left resilient member 81 against the left end surface 51b of the power-transmitting member 51, and similarly the right driven member 71R is resiliently urged via the right resilient member 81 against the right end surface 51b of the power-transmitting member 51.

As further illustrated in FIG. 4, the left driven member 71L is disposed between the power-transmitting member 51 and the left inner wall surface 12a of the transmission case 12, while the right driven member 71R is disposed between the power-transmitting member 51 and the right inner wall surface 12b of the transmission case 12. Thus, the left and right driven members 71L and 71R are each axially movable along the corresponding driven shaft 53L or 53R only within a limited amount.

Specifically, the left driven member 71L is axially movable only over a distance between the left end surface of the right driven shaft 53R and the left spring-biased plate 56, and the right driven member 71R is axially movable only over a distance between the right end surface of the larger-diameter portion 53a and the right spring-biased plate 56.

Namely, from a state where the left and right meshing claws 72L and 72R are meshing with the meshing claws 62L and 62R of the power-transmitting members 51, the left driven member 71L is movable over a fixed distance di from the spring-biased plates 56 secured to the left inner wall surface 12a of the transmission case 12, while the right driven member 71R is movable over a fixed distance di from the spring-biased plates 56 secured to the right inner wall surface 12b of the transmission case 12.

In this manner, the left and right driven members 71L and 71R are mounted on the left and right driven shafts 53L and 53R in such a manner that they are axially movable over the fixed amount while being prevented from rotating relative to the driven shafts 53L and 53R.

Figure 6:
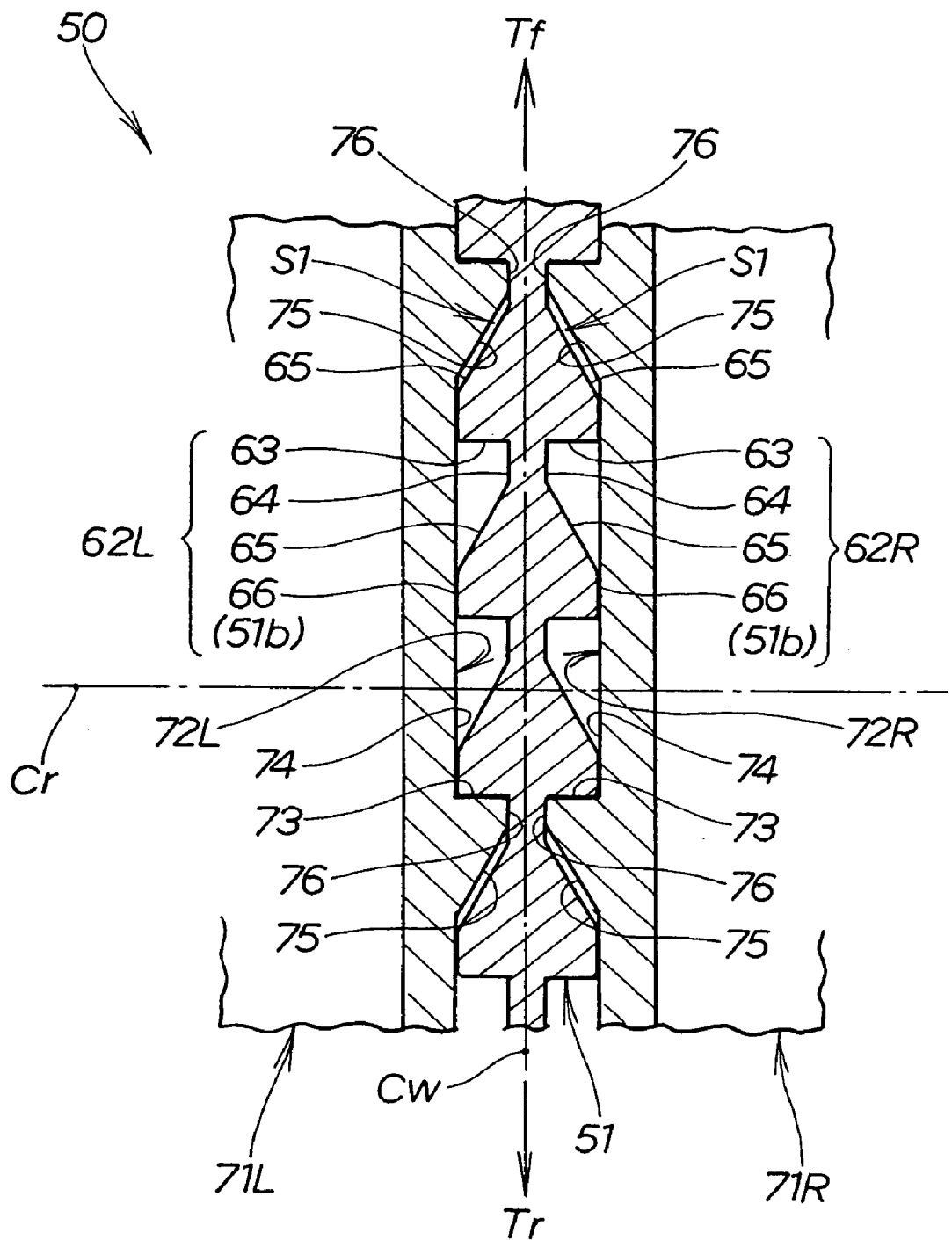
FIG. 6 is a circumferentially-developed view showing meshing claws of the differential device in a meshingly-engaged state.
Figure 7:
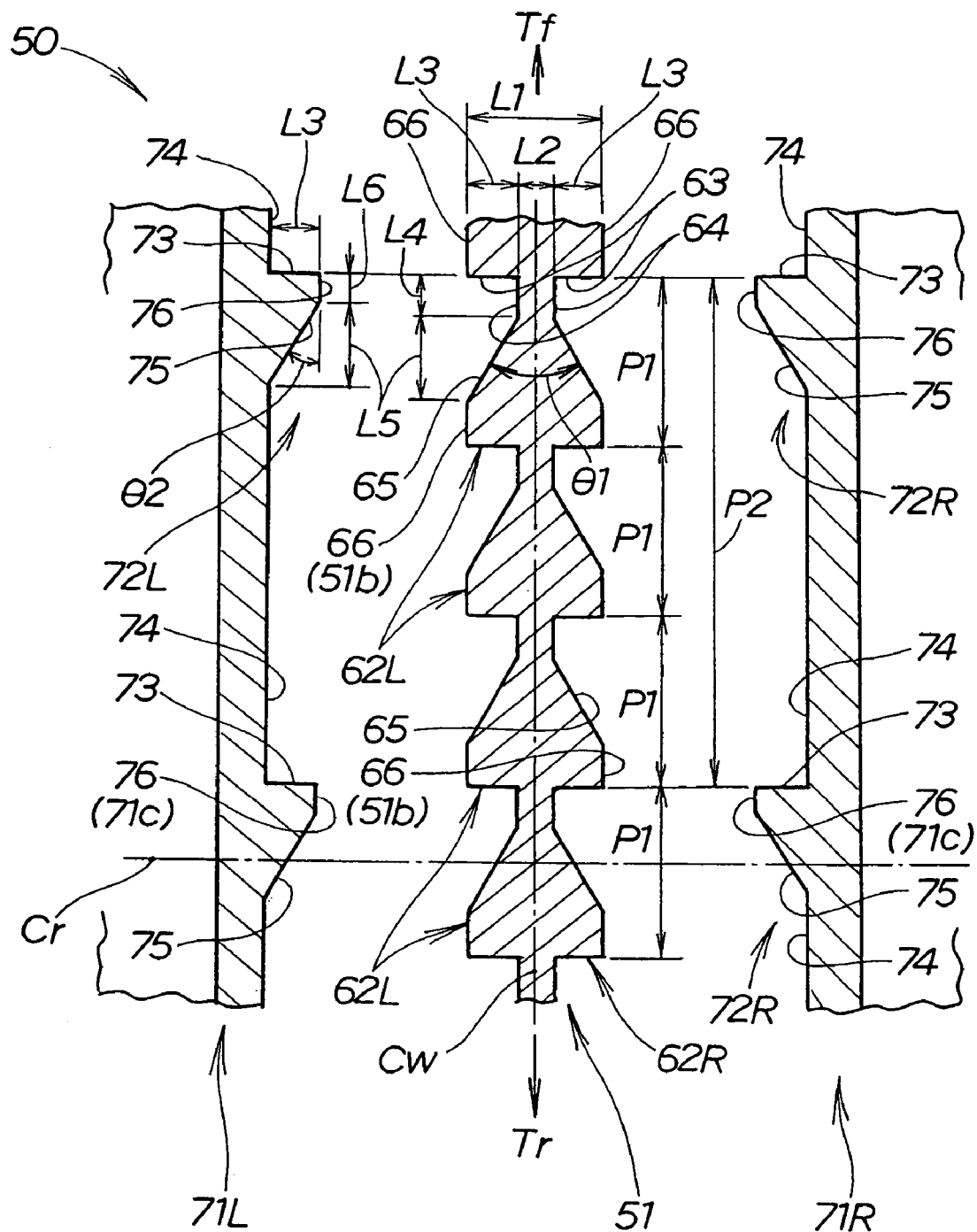
FIG. 7 is a circumferentially-developed view showing the meshing claws of the differential device in a disengaged state.

The following paragraphs describe specific construction of the meshing claws 62L, 72L and 62R, 72R. FIG. 6 is a circumferentially-developed view showing the meshing claws in a meshingly engaged state, and FIG. 7 is a circumferentially-developed view showing the meshing claws in a disengaged state. Note that FIGS. 6 and 7 show the meshing claws as developed along the circumference of the left and right driven members 71L and 71R; therefore, various dimensions and dimensional ratios of the meshing claws 62L, 72L and 62R, 72R to be referred to correspond to those shown in these developed views.

As illustrated in FIGS. 6 and 7, the meshing claws 62L, 72L and 62R, 72R are generally in the shape of jaw clutches commonly known as "dog clutches".

Specifically, in the power-transmitting member 51, the left meshing claws 62L and right meshing claws 62R are symmetrical about a widthwise centerline Cw that extends perpendicularly to the axial centerline Cr; therefore, the left and right meshing claws 62L and 62R have the same dimensions. Pitch P2 of the meshing claws 72L and 72R of the left and right driven members 71L and 71R is three times as great as a pitch P1 of the meshing claws 62L and 62R of the power-transmitting member 51. The left meshing claws 72L and right meshing claws 72R, formed on the left and right driven members 71L and 71R, respectively, are also symmetrical about the centerline Cw; therefore, the left and right meshing claws 72L and 72R have the same dimensions. The pitches P1 and P2 and various dimensions of the meshing claws may be chosen as desired.

The left meshing claws 62L, 72L and right meshing claws 62R, 72R are shaped substantially complementarily in such a manner that, when a difference between a load acting on the meshing engagement between the left meshing claws 62L and 72L and between a load acting on the meshing engagement between the right meshing claws 62R and 72R exceeds a preset reference value during the forward rotation Tf of the power-transmitting member 51, either the engagement between the left meshing claws 62L and 72L or the engagement between the right meshing claws 62R and 72R is cancelled, and that both the engagement between the left meshing claws 62L and 72L and the engagement between the right meshing claws 62R and 72R are constantly maintained during the reverse rotation Tr of the power-transmitting member 51.

More detailed description is given below about one of the left meshing claws 62L formed on the left end surface 51b of the power-transmitting member 51. The left meshing claw 62L has an abutting surface 63 parallel to the rotational centerline Cr, a bottom (valley) surface 64 extending continuously from an inner end of the abutting surface 63, an inclined surface 65 extending continuously from and inclined from the bottom surface 64 toward the left end surface 51b, and a flat peak surface 66 extending continuously from an outer end of the inclined surface 65; these surfaces are located in the order of mentioning along the reverse rotation direction Tr.

The abutting surface 63 is a flat surface extending from the left end surface 51b toward the widthwise centerline Cw so that it serves to keep the meshing claw engaged with the mating meshing claws during the reverse rotation Tr of the power-transmitting member 51. The bottom surface 64 is a flat surface parallel to the centerline Cw. The inclined surface 65 is a flat surface inclined along the reverse rotation direction Tr relative to the abutting surface 63 so that the meshing claw meshes with the mating meshing claws during the forward rotation Tf of the power-transmitting member 51. The peak surface 66 is a flat surface parallel to the widthwise centerline Cw and constituting the left end surface 51b.

Thus, each pair of the left and right meshing claws 62L and 62R of the power-transmitting member 51 together take a shape tapering in the forward rotation direction Tf, as seen in FIG. 7.

As also illustrated in FIG. 7, a dimension between each pair of the left and right peak surfaces 66 (i.e., between the left and right end surfaces 51b) in the power-transmitting member 51 is L1, while a length between the left and right bottom surfaces 64 is L2. Thus, each of the abutting surfaces 63 has a length (i.e., depth) L3 (=(L1−L2)/2); namely, a distance from the bottom surface 64 to the peak surface 66 is L3. Each of the bottom surfaces 64 has a length L4 in the circumferential direction, and each of the inclined surfaces 65 has a length L5 in the circumferential direction. As a consequence, an angle θ1 is formed between the left and right inclined surfaces 65. The angle (inclination angle) θ1 may be set to any desired value.

Detailed description is given below about one of the left meshing claws 72L formed on the inner surface 71c (see FIG. 5) of the left driven member 71. The left meshing claw 72L has an abutting surface 73 parallel to the rotational centerline Cr, a bottom (valley) surface 74 extending continuously from an inner end of the abutting surface 73, an inclined surface 75 extending continuously from the bottom surface 74 and inclined toward the inner end surface 71c and a flat peak surface 76 extending continuously from an inner end of the inclined surface 75, which surfaces are located in the order of mentioning along the forward rotation direction Tf.

The abutting surface 73 is a flat surface extending from the end surface 71b away from the widthwise centerline Cw so that it serves to keep the meshing claw engaged with the mating meshing claws during the reverse rotation Tr of the power-transmitting member 51. The bottom surface 74 is a flat surface parallel to the widthwise centerline Cw. The inclined surface 75 is a flat surface inclined along the forward rotation direction Tf relative to the abutting surface 73 so that the meshing claw meshes with the mating meshing claws during the forward rotation Tf of the power-transmitting member 51. The peak surface 76 is a flat surface parallel to the centerline Cw and constituting the inner end surface 71c.

As also illustrated in FIG. 7, each of the abutting surfaces 73 in the left driven member 71L has a length L3; namely, a length from the bottom surface 74 to the peak surface 76 is L3. Each of the inclined surface 75 has a length L5 in the circumferential direction. Each of the peak surface 76 has a length L6 in the circumferential direction, which is slightly smaller than the circumferential length L4 of the bottom surface 74 of the power-transmitting member 51. Each of the inclined surfaces 75 has an inclination angle θ2, which equals one half of the above-mentioned inclination angle θ1.

As shown in FIG. 6, when the abutting surfaces 73 of the left and right driven members 71L and 71R are in abutting contact with the abutting surfaces 63 of the power-transmitting member 51, slight gaps S1 are left between the inclined surfaces 65 and 75 of the power-transmitting member 51 and the driven members 71L and 71R.

Figure 8A:
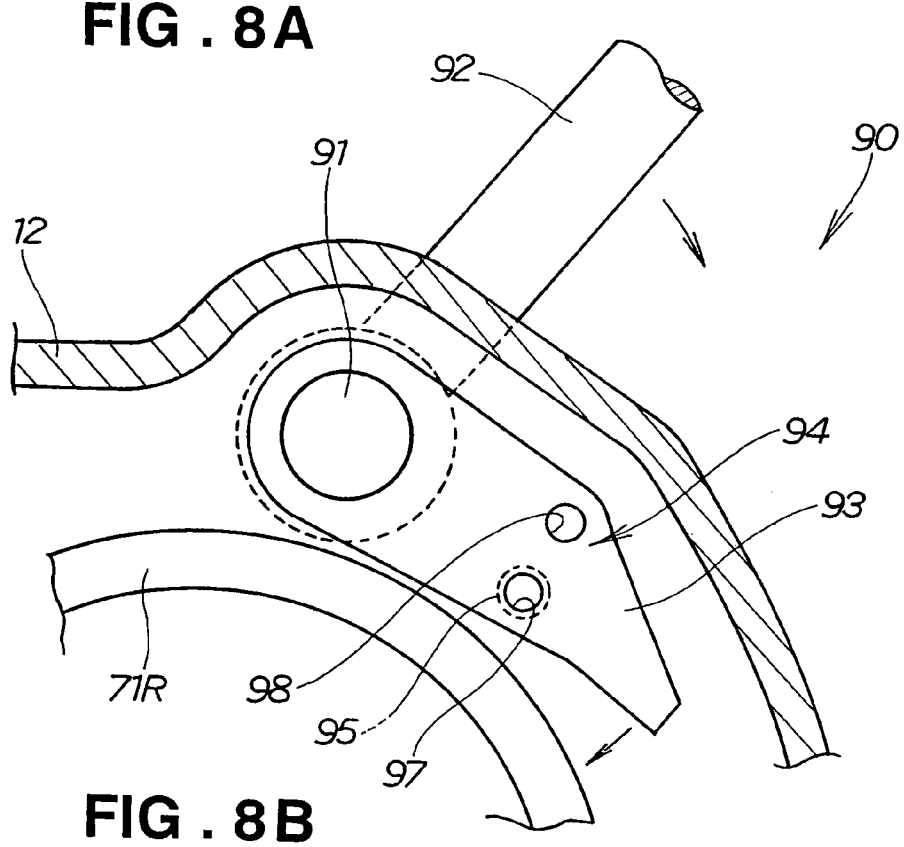
FIGS. 8A and 8B are views showing a claw control mechanism in the differential device of the present invention.
Figure 8B:
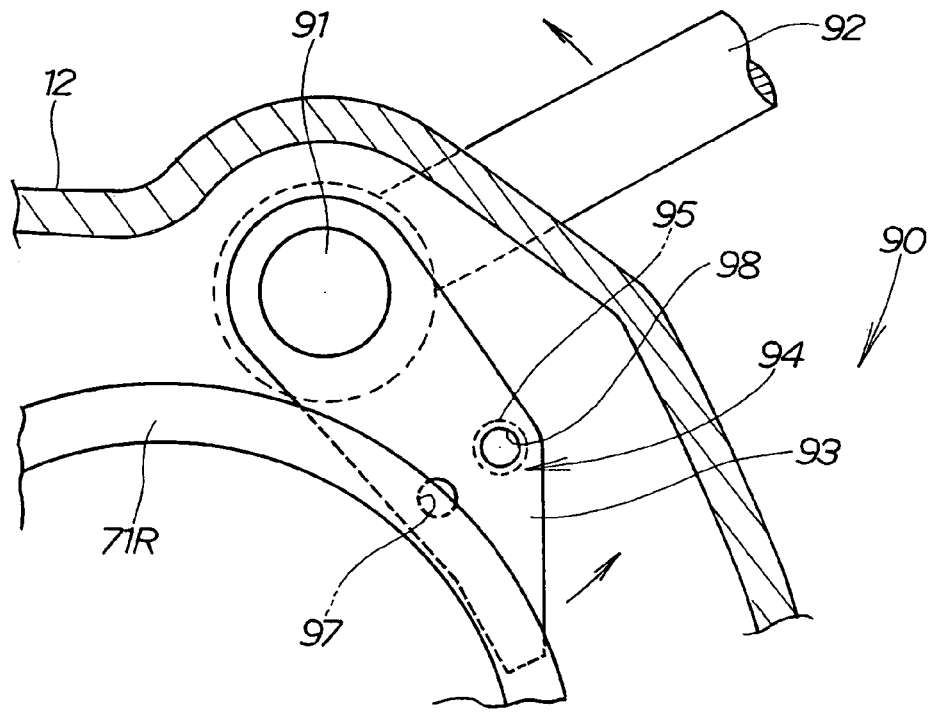

FIG. 8A shows the claw control mechanism (i.e., differential-operation restricting mechanism) 90 in an unlocking state, and FIG. 8B shows the claw control mechanism 90 in a locking state. The claw control mechanism 90 will be described below with reference to FIGS. 4 and 8A and 8B. The claw control mechanism 90 is a differential-operation restricting mechanism for compulsorily keeping the meshing engagement between the left meshing claws 62L and 72L and between the right meshing claws 62R and 72R by restricting, as desired, retreat of either or both of the left and right driven members 71L and 71R from the corresponding end surface(s) 51b of the power-transmitting member 51.

Specifically, the claw control mechanism 90 includes a connecting shaft 91 rotatably mounted on the transmission case 12, the control lever 92 (see also FIG. 1) connected to the connecting shaft 91 outside the transmission case 12, a control arm 93 connected to the connecting shaft 91 within the transmission case 12, and a self-retaining mechanism 94 for selectably retaining the control arm 93 in a locking or unlocking position. The control arm 93 is pivotable toward and away from a back surface 71d (see FIG. 4) of the right driven member 71R.

As seen from FIG. 4, the self-retaining mechanism 94 includes a ball member 95 provided in the transmission case 12, and a compression coil spring 96 for resiliently pressing the ball member 95 against the control arm 93. The self-retaining mechanism 94 also has first and second fitting holes 97 and 98 for selectively receiving part of the ball member 95.

As illustrated in FIG. 8A, the control arm 93 can be retained in the unlocking position by the ball member 95 partly fitting in the first fitting hole 97, but the control arm 93 can be retained in the locking position by the ball member 95 partly fitting in the second fitting hole 98 as illustrated in FIG. 8B. In the unlocking position, the control arm 93 is located radially outwardly of the right driven member 71R.

As the control lever 92 is caused to pivot in a clockwise direction of FIG. 8A, the control arm 93 pivots in the clockwise direction so as to face the back surface 71d (FIG. 4) of the right driven member 71R. Thus, the left and right meshing claws 62L, 72L and 62R, 72R can be compulsorily brought into meshing engagement by restricting, as desired, the retreat of the right driven member 71R from the right end surface 51b of the power-transmitting member 51; the meshing engagement can be maintained by the self-retaining mechanism 94.

Then, as the control lever 92 is caused to pivot in a counterclockwise direction of FIG. 8A, the control arm 93 pivots in the counterclockwise direction to return to the original unlocking state and retained in the unlocking state by the self-retaining mechanism 94.

Now, with reference to FIGS. 9–14, a description will be given about behavior of the differential device 50 constructed in the above-described manner.

FIGS. 9A and 9B are a first set of views explanatory of the behavior of the differential device 50. Specifically, FIG. 9A is a sectional view showing the differential device 50 in corresponding relation to FIG. 4, and FIG. 9B is a circumferentially-developed view of the left and right engaging/disengaging mechanisms 60L and 60R, which corresponds to FIG. 6.

As seen in FIG. 9A, when the power-transmitting member 51 is at rest, the left and right resilient members 81 press the left and right driven members 71L and 71R with substantially equal resilient forces. The power-transmitting member 51 is sandwiched or interposed between these driven members 71L and 71R with its left and right surfaces pressed by the driven members 71L and 71R. In this state, the left and right engaging/disengaging mechanisms 60L and 60R are in an engaging (locking) position where the left and right meshing claws 62L and 62R of the power-transmitting member 51 are placed in deepest engagement with the left and right meshing claws 72L and 72R of the driven members 71L and 71R. Distance between the peak surfaces 76 of the left and right driven members 71L and 71R is M1, which is equal to the length L2 between the left and right bottom surfaces 64 of the power-transmitting member 51 (M1=L2).

Then, as the power-transmitting member 51 is rotated in the forward direction Tf, the left and right inclined surfaces 65 of the power-transmitting member 51 are brought into abutting contact with the left and right inclined surfaces 75 of the left and right driven members 71L and 71R, so that the driving power transmitted from the member 51 acts on the inclined surfaces 75. As a consequence, leftward and rightward (horizontal) component forces act on the inclined surfaces 75, so that the left and right driven members 71L and 71R are displaced, against the resilient biasing forces of the resilient members 81, away from the power-transmitting member 51 in directions D1 and Dr. FIGS. 10A and 10B show the left and right driven members 71L and 71R having been displaced in this manner.

FIGS. 10A and 10B are a second set of views explanatory of the behavior of the differential device 50. Specifically, FIG. 10A is a sectional view of the differential device 50, and FIG. 10B is a circumferentially-developed view of the left and right engaging/disengaging mechanisms 60L and 60R.

In FIG. 10A, the left and right driven members 71L and 71R are located remotest from the power-transmitting member 51 in abutting contact with the spring-biased plates 56. In this state, as illustrated in FIG. 10B, the distance between the peak surfaces 76 of the left and right driven members 71L and 71R is M2, which is smaller than the distance L1 between the peak surfaces 66 of the power-transmitting member 51 (M2<L1). Therefore, the left and right engaging/disengaging mechanisms 60L and 60R are placed in the engaging (locking state) when the power-transmitting member 51 rotates in the forward direction Tf.

As the power-transmitting member 51 is further rotated in the forward direction Tf, the driving power is transmitted from the transmitting member 51, via the engaging/disengaging mechanisms 60L and 60R, equally to the left and right driven shafts 53L and 53R, so that the driven shafts 53L and 53R, can be rotated in the forward direction Tf.

Namely, as the power-transmitting member 51 is rotated in the forward direction Tf, the meshing claws 62L and 62R formed on the transmitting member 51 mesh with the meshing claws 72L and 72R formed on the left and right driven members 71L and 71R, to thereby distribute the driving power to the left and right driven shafts 53L and 53R. In this way, the working machine 10 can travel straight in the forward direction Fr.

Then, the working machine 10 traveling straight in the forward direction Fr can be turned in either one of the following two ways.

According to the first way of turning the working machine 10, the left operating handle 31L of FIG. 2, located at an outer side of the turning track, is pushed ahead more strongly than the operating handle 31R located at an inner side of the turning track. For example, if the working machine 10 is to be turned right, the human operator pushes the left operating handle 31L with a greater force P1 while pushing the right operating handle 31R with a smaller force P2 that is typically near zero (P1>P2).

The greater pushing force P1 causes the rotating left traveling wheel 13L to rotate at a higher speed than the right traveling wheel 13R; namely, the difference between the left and right pushing forces P1 and P2 results in a speed difference between the left and right driven shafts 53L and 53R, as seen in FIGS. 11A and 11B.

FIGS. 11A and 11B are a third set of views explanatory of the behavior of the differential device 50. Specifically, FIG. 1A is a sectional view of the differential device 50, and a left half section of FIG. 11B is a circumferentially-developed view of the left and right engaging/disengaging mechanisms 60L and 60R partway through their engaging operations while a right half section of FIG. 11B is a circumferentially-developed view of the left and right engaging/disengaging mechanisms 60L and 60R having completed the engaging operations.

Because the left driven shaft 53L in FIG. 1A is rotating at a higher speed than the right driven shaft 53R, the left driven member 71L is rotating faster than the right driven member 71R. Then, as illustrated in the left half section of FIG. 11B, the left driven member 71L moves in the forward rotation direction Tf ahead of the right driven member 71R. As a consequence, the gap S2 is produced between the left inclined surfaces 65 and 75, with only the right inclined surfaces 65 and 75 contacting with each other. Because of the forward rotation of the power-transmitting member 51, a rightward horizontal component force acts on the right inclined surfaces 65 and 75, so that a horizontal reactive force acts on the power-transmitting member 51 in the leftward direction D1. The reactive force causes the power-transmitting member 51 to move in the direction of arrow D1, so that the transmitting member 51 approaches the left driven member 71L or presses the left driven member 71L in the direction D1.

Thus, as seen in the right half section of FIG. 11B, the left engaging/disengaging mechanism 60L is brought to the engaging state with the left meshing surfaces 65 and 75 contacting each other. In the engaging state, the right driven member 71R abuts against the spring-biased plate 56 while the left driven member 71L abuts or is on the verge of abutting against the spring-biased plate 56, as seen in FIG. 11A. At this stage, the distance between the peak surfaces 76 of the left and right driven members 71L and 71R is M3, which is equal to or slightly smaller than the distance M2 of FIG. 10B (M3≧M2), as seen in the right half section of FIG. 11B. Further, the distance M3 is equal to or slightly smaller than a sum between the length L2 between the left and right bottom surfaces 64 and the length L3 of the abutting surface 63 (i.e., M3≧L2+L3).

Therefore, the right peak surfaces 66 of the power-transmitting member 51 run onto the peak surfaces 76 of the right driven member 71R. As a consequence, the right engaging/disengaging mechanism 60R is brought into the disengaging (unlocking) state with only the left engaging/disengaging mechanism 60L kept in the engaging (locking) state. Namely, one of the left and right engaging/disengaging mechanisms 60L and 60R is brought into the disengaging (unlocking) state once a difference in the load acting on the meshing engagement between the left meshing claws 62L and 72L and the load acting on the meshing engagement between the right meshing claws 62R and 72R exceeds the reference value during the forward rotation Tf of the power-transmitting member 51.

Therefore, as seen in FIG. 11A, the driving force can be transmitted from the power-transmitting member 51 only to the left driven shaft 53L to thereby rotate the left driven shaft 53L in the forward direction Tf. In this way, the working machine 10 of FIG. 2 can be turned right.

It should be appreciated that the working machine 10 can be turned left by the human operator performing operation in the opposite direction to the above-described operation for the right turning.

Namely, the working machine 10 can be turned with ease by the human operator performing turning operation such that load unbalance (load difference) exceeding the reference value is produced between the left and right driven members 71L and 71R.

According to the second way of turning the working machine 10, the left and right operating handles 31L and 31R of FIG. 2 are both turned outward along a turning track. For example, when the working machine 10 is to be turned right, both of the left and right operating handles 31L and 31R are turned in a direction of arrow Tu (clockwise direction) of FIG. 2, so that the working machine 10 will pivot relative to the ground surface in the direction of arrow Tu about the right traveling wheel 13R, located at an inner side of the turning track, as a pivot axis Ot. During that time, a great resistance acts on the right traveling wheel 13R and right driven shaft 53R to restrict their rotation. Namely, a resistance against the travel of the right traveling wheel 13R increases, results of which are illustratively shown in FIGS. 10A and 10B.

Namely, in FIG. 10A, a great rotation-restricting force acts on the right traveling wheel 13R due to the great resistance against the rotation of the right driven shaft 53R. Because the power-transmitting member 51 is rotating in the forward direction Tf, the rightward horizontal component force acting on the right inclined surfaces 65 and 75 is greater than the leftward horizontal component force acting on the left inclined surfaces 65 and 75. Such a difference between the left and light horizontal component forces results in a leftward horizontal reactive force acting on the power-transmitting member 51, which causes the transmitting member 51 to press the left driven member 71L leftward.

As a consequence, only the left engaging/disengaging mechanism 60L is brought into the engaging state with only the left inclined surfaces 65 and 75 contacting each other, as with the first way of turning shown in the right half section of FIG. 11B. In this state, as illustrated in FIG. 11A, the right driven member 71R abuts against the spring-biased plate 56 while the left driven member 71L abuts or is on the verge of abutting against the spring-biased plate 56. In this case too, there can be established relationships "M3≧M2" and "M3≧M2+L3" (see also FIG. 7 and FIG. 10B).

Therefore, the right peak surfaces 66 of the power-transmitting member 51 run onto the peak surfaces 76 of the right driven member 71R. As a consequence, the right engaging/disengaging mechanism 60R is brought into the disengaging (unlocking) state with only the left engaging/disengaging mechanism 60L kept in the engaging (locking) state. Namely, one of the left and right engaging/disengaging mechanisms 60L and 60R is brought into the disengaging (unlocking) state once the difference in the loads acting between the left meshing claws 62L and 72L and acting between the right meshing claws 62R and 72R exceeds the reference value during the forward rotation Tf of the power-transmitting member 51.

Therefore, as seen in FIG. 11A, the driving force can be transmitted from the power-transmitting member 51 only to the left driven shaft 53L to thereby rotate the left driven shaft 53L in the forward direction Tf. In this way, the working machine 10 of FIG. 2 can be turned right.

It should be appreciated that the working machine 10 can be turned left by the human operator performing operation in the opposite direction to the above-described operation for the right turning.

Namely, the working machine 10 can be turned with ease by the human operator performing turning operation such that load unbalance (load difference) exceeding the reference value is produced between the left and right driven members 71L and 71R.

The differential device 50 behaves as follows when the power-transmitting member 51 is rotated in the reverse direction Tr.

FIGS. 12A and 12B are a fourth set of views explanatory of the behavior of the differential device 50. Specifically, FIG. 12A is a sectional view of the differential device 50, and FIG. 12B is a circumferentially-developed view of the left and right engaging/disengaging mechanisms 60L and 60R in the engaging state.

As the power-transmitting member 51 is rotated in the reverse direction Tr, the left and right abutting surfaces 63 of the transmitting member 51 abuttingly contact the respective abutting surfaces 73 of the left and right driven members 71L and 71R. Thus, the left and right engaging/disengaging mechanisms 60L and 60R are brought into the engaging (locking) state through the reverse rotation of the power-transmitting member 51.

As the power-transmitting member 51 is further rotated in the reverse direction Tr, the driving power is transmitted from the transmitting member 51, via the engaging/disengaging mechanisms 60L and 60R, equally to the left and right driven shafts 53L and 53R, so that the driven shafts 53L and 53R can be rotated in the reverse direction Tr. In this way, the working machine 10 of FIG. 2 can travel straight in the rearward direction Rr.

Namely, during the reverse rotation of the power-transmitting member 51, the meshing engagement can be kept between the meshing claws 62L and 62R and the meshing claws 72L and 72R, to thereby distribute the driving power from the transmitting member 51 to the left and right driven members 71L and 71R. Therefore, even when load unbalance is produced between the left and right driven members 71L and 71R, the differential device 50 can achieve sufficient performance for delivering the power from the power-transmitting member 51 to the left and right driven shafts 53L and 53R.

The differential device 50 behaves as follows when the claw control mechanism 90 is operated while the power-transmitting member 51 is at rest.

Figure 13A:
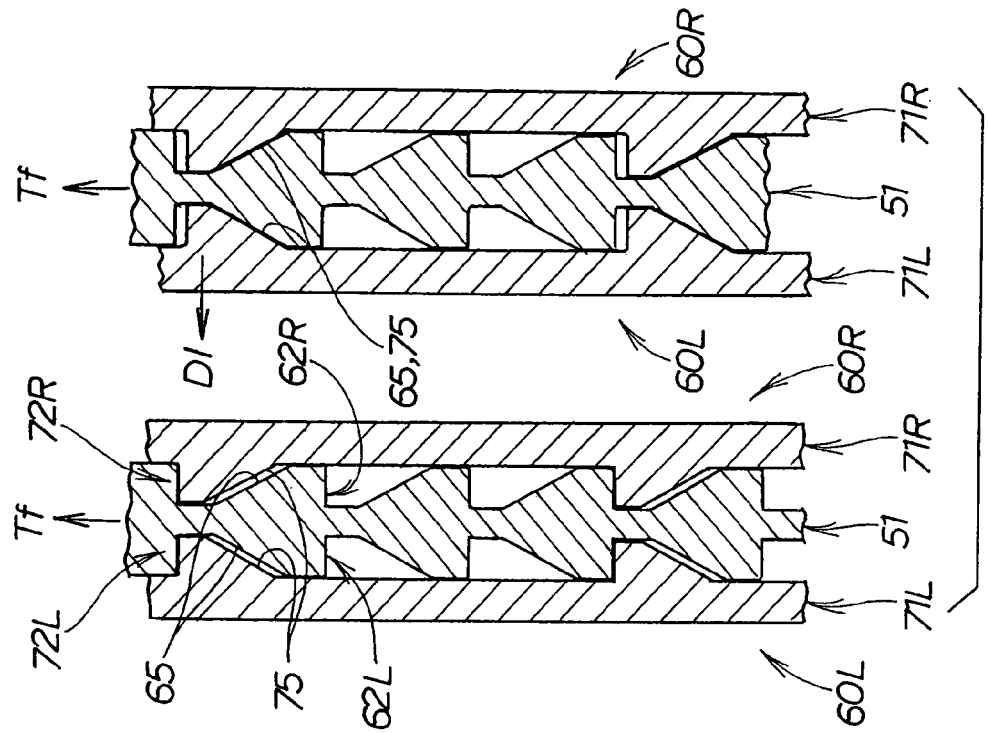
FIGS. 13A and 13B are a fifth set of views explanatory of the behavior of the differential device of the present invention.
Figure 13B:
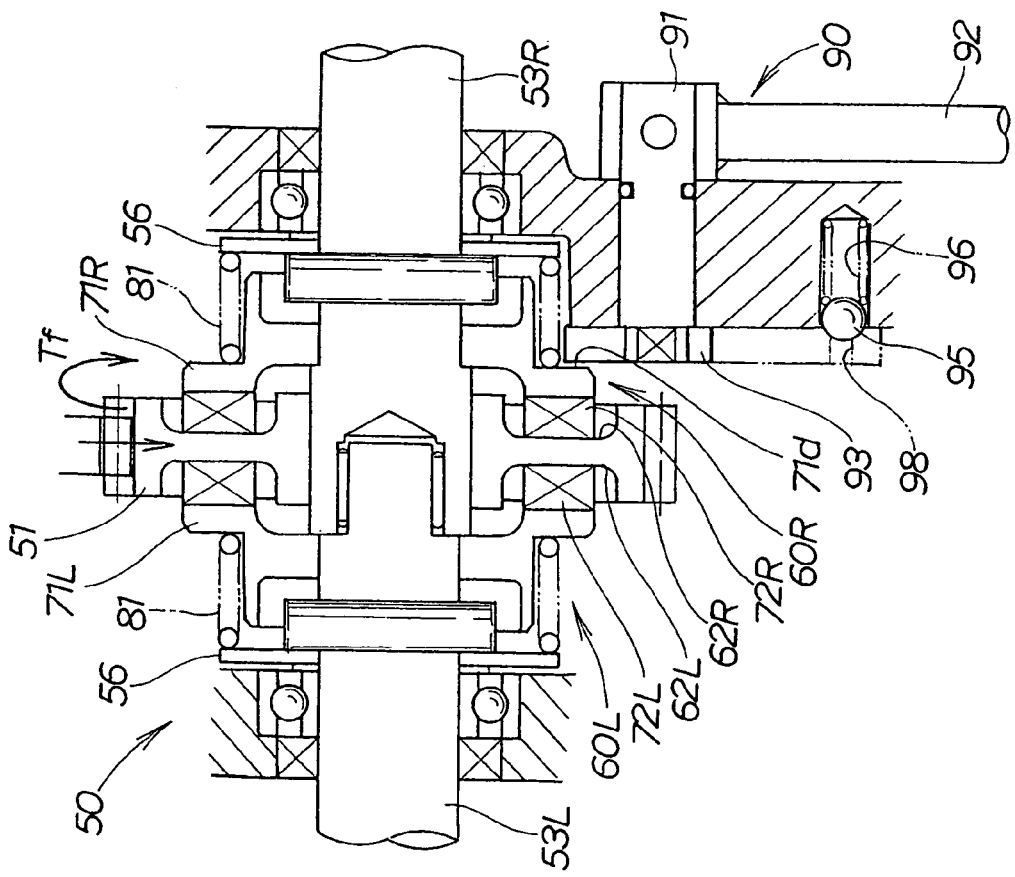

FIGS. 13A and 13B are a fifth set of views explanatory of the behavior of the differential device 50. Specifically, FIG. 13A is a sectional view of the differential device 50, and a left half section of FIG. 13B is a circumferentially-developed view of the left and right engaging/disengaging mechanisms 60L and 60R in the engaging state while a right half section of FIG. 13B is a circumferentially-developed view of the left and right engaging/disengaging mechanisms 60L and 60R partway through their engaging operations when the power-transmitting member 51 is rotated in the forward direction Tf.

As seen in FIG. 13A, the control arm 93 is controlled by the control lever 92 while the transmitting lever 51 is at rest so that the arm 93 pivots to face the back surface 71d of the right driven member 71R. Thus, it is possible to restrict the retreat of the right driven member 71R from the right end surface of the power-transmitting member 51. In this way, the left and right engaging/disengaging mechanisms 60L and 60R can be kept in the engaging state.

Then, as the power-transmitting member 51 is rotated in the forward direction Tf, the left and right inclined surfaces 65 of the power-transmitting member 51 are brought into abutting contact with the left and right inclined surfaces 75 of the left and right driven members 71L and 71R, so that the driving power is transmitted from the member 51 to the inclined surfaces 75. As a consequence, leftward and rightward (horizontal) component forces act on the inclined surfaces 75, However, movement of the right driven member 71R is prevented by the control arm 93. The left driven member 71L, on the other hand, moves in the arrow D1 direction away from the power-transmitting member 51 against the biasing force of the resilient member 81, results of which are illustrated in FIGS. 14A and 14B.

Figure 14A:
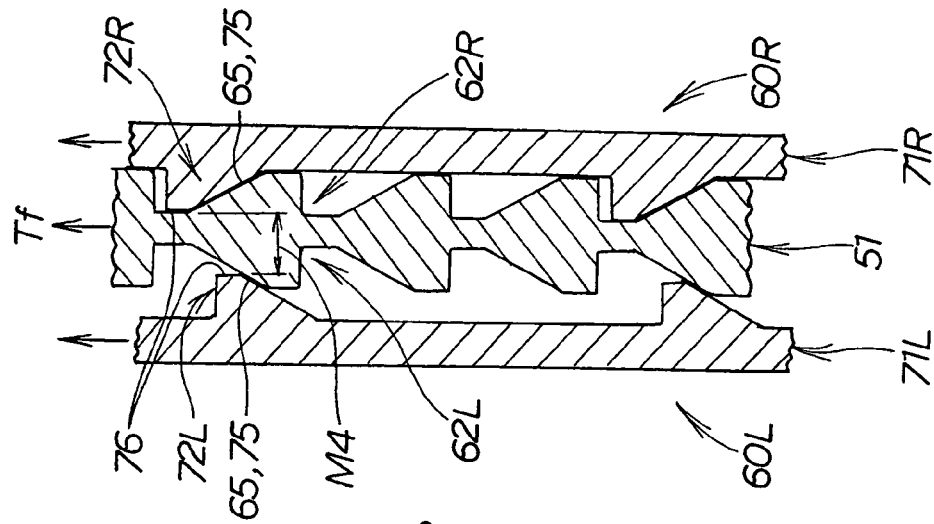
FIGS. 14A and 14B are a sixth set of views explanatory of the behavior of the differential device of the present invention.
Figure 14B:
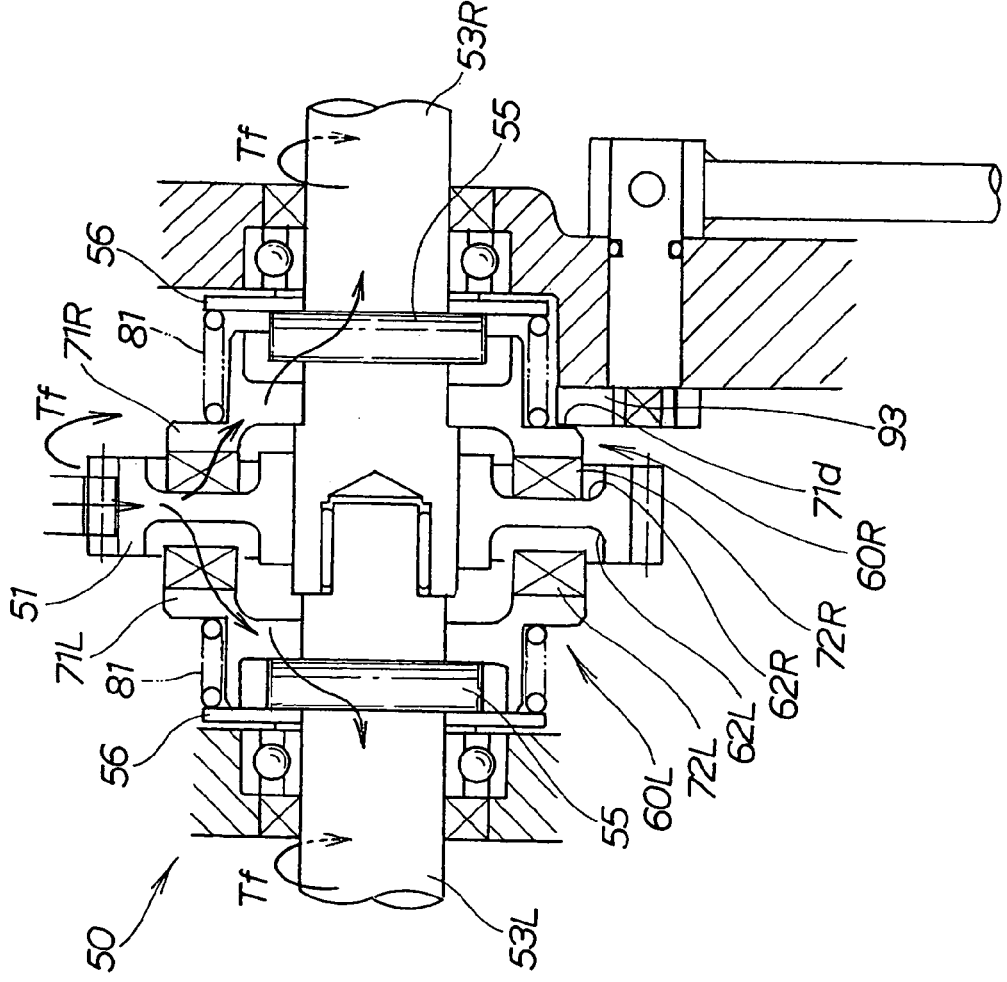
Figure 15:
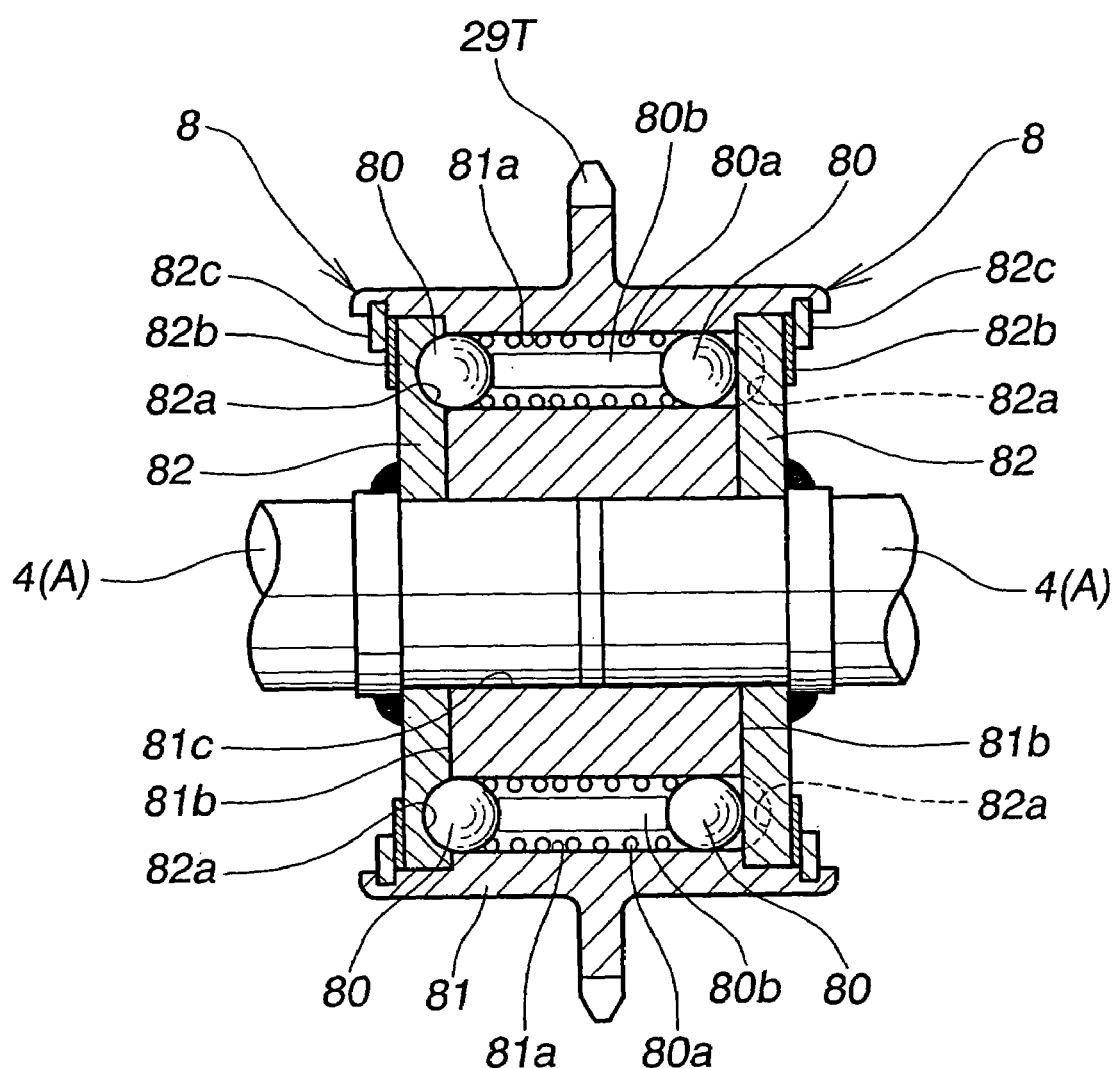
FIG. 15 is a sectional view of a conventional differential device for an agricultural working machine.

FIGS. 14A and 14B are a sixth set of views explanatory of the behavior of the differential device 50. Specifically, FIG. 14A is a sectional view of the differential device 50, and FIG. 14B is a circumferentially-developed view of the left and right engaging/disengaging mechanisms 60L and 60R in the engaging state.

As seen in FIG. 14A, movement of the right driven member 71R is prevented by the control arm 93, while the left driven member 71L is in abutting contact with the spring-biased plate 56. At this stage, the distance between the peak surfaces 76 of the left and right driven members 71L and 71R is M4, which is smaller than the distance M2 of FIG. 10B (M4<M2), as seen in FIG. 14B. Further, the distance M4 is smaller than a sum between the length L2 between the left and right bottom surfaces 64 and the length L3 of the abutting surface 63 (i.e., M4<L2+L3). As a consequence, the left and right engaging/disengaging mechanisms 60L and 60R are kept in the engaging state.

Namely, the differential operation by the differential device 50 can be restricted by manipulation of the claw control mechanism 90.

As the power-transmitting member 51 is further rotated in the forward direction Tf, the driving power is transmitted from the transmitting member 51, via the engaging/disengaging mechanisms 60L and 60R, equally to the left and right driven shafts 53L and 53R, so that the driven shafts 53L and 53R can be rotated in the forward direction Tf. In this way, the working machine 10 of FIG. 2 can travel straight in the forward direction Fr.

Thus, the left and right meshing claws 62L, 72L and 62R, 72R can be compulsorily brought into meshing engagement by restricting, as desired, the retreat of either or both of the left and right driven members 71L and 71R from the end surface(s) of the power-transmitting member 51. Therefore, even when load unbalance is produced between the left and right driven members 71L and 71R, it is possible to secure sufficient performance for delivering the power from the power-transmitting member 51 to the left and right driven shafts 53L and 53R.

The following paragraphs describe in greater detail the reason whey the claw control mechanism 90 is provided in the differential device 50 of the present invention.

For example, when the left traveling wheel 13L of FIG. 2 has slipped on a road of small surface resistance, such as a muddy or sandy road, the driving power to the traveling wheel 13L greatly decreases. Further, when traveling resistance to the right traveling wheel 13R has greatly increased, the driving power to the traveling wheel 13R significantly increases.

When such load unbalance has occurred between the left and right traveling wheels 13L and 13R, the reactive force to the inclined surface 75 of the left driven member 71L in the illustrated example of FIGS. 10A and 10B is much smaller than the reactive force to the inclined surface 75 of the right driven member 71R. Thus, the power-transmitting member 51 is pressed against the left driven member 71L due to the greater reactive force to the inclined surface 75 of the right driven member 71R.

Thus, the left driven member 71L is caused to move in the forward rotation direction Tf by an increased vertical component force acting on its inclined surface 75 (i.e., component force in the forward direction). Therefore, when a difference in applied traveling power between the left and right traveling wheels 13L and 13R has exceeded a reference value, the differential device 50 behaves in the same manner as in the right turning; that is, the inclined surfaces 65 of the power-transmitting member 51 disengage from the right driven member 71R. Even in such a case, it is necessary to secure sufficient traveling performance of the working machine 10 of FIG. 2. This is the primary reason why the differential device 50 of the present invention is provided with the claw control mechanism (or differential-operation restricting mechanism) 90.

For both of the forward and reverse rotations of the power-transmitting member 51, the differential device 50 of the present invention can achieve sufficient performance for delivering the power from the power-transmitting member 51 to the left and right driven shafts 53L and 53R, with only simple arrangements. Consequently, for both of the forward and rearward travel, the differential device 50 permits sufficient traveling performance of working machines and various other vehicles which are provided with the differential device 50 of the invention. Particularly advantageous results can be attained in cases where the differential device 50 of the invention is employed in working machines and various other vehicles which can not be turned during rearward travel, because the differential device 50 is significantly simplified in construction.

Let's now consider the case where the differential device 50 of the invention is provided in the front-rotary working machine 10 (FIG. 2).

(1) During earth-cultivating work, it just suffices for the human operator to cause the working machine 10 to travel straight in the forward direction without making turns. This is because there is a need to cultivate the earth straight irrespective of conditions, such as hardness, undulation etc., of the earth to be cultivated. Therefore, the human operator only has to manipulate the claw control mechanism 90 to disable turning movement of the working machine 10.

(2) When simply moving the working machine 10 forward without performing earth-cultivating work (i.e., during simple transfer from one place to another of the machine 10), the human operator may turn the machine 10 in addition to straightforward movement. In this case, the human operator only has to permit the necessary turning by manipulating the claw control mechanism 90.

(3) When the working machine 10 should travel rearward, neither turning movement of the machine 10 nor earth-cultivating work need to be performed, and thus the human operator only has to so operate the machine 10.

It should be appreciated that the differential device 50 of the present invention may be applied to various types of vehicles in addition to walk-behind working machines such as cultivating machines and snow-removing machines.

Furthermore, the power-transmitting member 51 in the differential device 50 of the present invention may be in the form of a sprocket of a chain drive mechanism, rather than the gear.

Moreover, as set forth in relation to FIG. 7, the above-mentioned inclination angle θ1 of the inclined surfaces 65 of the meshing claws 62L and 62R and the above-mentioned inclination angle θ2 of the inclined surfaces 75 of the meshing claws 72L and 72R (θ2=θ1/2) may be set to any suitable values. By thus setting the inclination angles θ1 and θ2 to any suitable values, it is possible to suitably set leftward and rightward (horizontal) component forces acting on the inclined surfaces 75, as represented by arrows Dl and Dr of FIG. 9, when the driving power from the power-transmitting member 51 acts on the left and right driven members 71L and 71R. Thus suitably setting the horizontal component forces can suitably set the "reference value" for the forward rotation Tf of the power-transmitting member 51.

As set forth above, the "reference value" represents a threshold value preset for the difference between the load acting on the meshing engagement between the left meshing claws 62L and 72L and between the load acting on the meshing engagement between the right meshing claws 62R and 72R during the forward rotation Tf of the power-transmitting member 51, i.e. a threshold value for initiating the differential operation between the left and right traveling wheels; namely, when the load difference has exceeded the reference value, the meshing engagement in either one of the left and right engaging/disengaging mechanisms 60L and 60R is canceled.

In summary, the differential device of the present invention can achieve sufficient performance for distributing the driving power from the power-transmitting member to the left and right driven shafts irrespective of whether the power-transmitting member is rotating in the forward direction or in the reverse direction, with simple arrangements.

Obviously, various minor changes and modifications of the present invention are possible in the light of the above teaching. It is therefore to be understood that within the scope of the appended claims the invention may be practiced otherwise than as specifically described.

What is claimed is:

1. A differential device comprising:

a power-transmitting member mounted to undergo rotation in forward and reverse directions, the power-transmitting member having left and right meshing claws formed on respective left and right surfaces thereof and having an interior space;

left and right driven shafts each having an end portion disposed in the interior space of the power-transmitting member, the left and right driven shafts being rotatable relative to each other about a rotational centerline of the power-transmitting member, and the power-transmitting member being movable in an axial direction of the left and right driven shafts;

left and right driven members mounted on the respective left and right driven shafts so as to sandwich therebetween the left and right surfaces of the power-transmitting member and being axially movable along the left and right driven shafts over a predetermined distance toward and away from the left and right surfaces of the power-transmitting member, the left and right driven members having respective left and right meshing claws formed on respective surfaces, thereof disposed opposite to the left and right surfaces of the power-transmitting member for meshing engagement with the respective left and right meshing claws of said power-transmitting member so that driving power is transmitted from the power-transmitting member to the left and right driven shafts by rotation of the power-transmitting member, the left and right driven members being normally resiliently urged toward the surfaces of the power-transmitting member, the left and right meshing claws of the power-transmitting member and the left and right meshing claws of the driven members being arranged to meshingly engage/disengage with/from each other so that during forward rotation of power-transmitting member, either the meshing engagement between the left meshing claws of the power-transmitting member and the left driven member or the meshing engagement between the right meshing claws of the power-transmitting member and the right driven member is cancelled when a difference between loads acting on the meshing engagement between the left meshing claws and acting on the meshing engagement between the right meshing claws exceeds a predetermined reference value, and so that during reverse rotation of the power-transmitting member, both the meshing engagement between the left meshing claws and the meshing engagement between the right meshing claws are constantly maintained; and a claw control mechanism for compulsorily maintaining the meshing engagement between the left meshing claws and the meshing engagement between the right meshing claws of the power-transmitting member and the left and right driven members by restricting retreat of either or both of the left and right driven members from the respective left and right surfaces of the power-transmitting member;

wherein each of the left and right meshing claws of the power-transmitting member and the left and right driven members has an abutting surface extending generally parallel to the rotational centerline of the power-transmitting member so as to allow the meshing engagement between the left meshing claws and the meshing engagement between the right meshing claws to be constantly maintained during the reverse rotation of the power-transmitting member, and has an inclined surface extending from the abutting surface and inclined along the direction of rotation of the power-transmitting member relative to the abutting surfaces of other meshing claws with which the meshing claw is to be meshed during the forward rotation of the power-transmitting member;

wherein when the power-transmitting member rotates to transmit driving power to the left and right driven members through engagement between left and right meshing claws of the power-transmitting member and the left and right driven members, leftward and rightward components forces acting on the inclined surfaces of the left and right meshing claws displace the driven members in an axial outward direction away from the power-transmitting member to define therebetween a space for allowing axial movement of the power-transmitting member within the space; and wherein a difference between speeds of rotation of the left and right driven shafts or a difference in loads acting on the left and right driven shafts occurs when an external force is applied to either of the left and right driven shafts.

2. A differential device according to claim 1; wherein the inclined surfaces of the left and right meshing claws of the power-transmitting member engage the respective inclined surfaces of the left and right meshing members during transmission of driving power from the power-transmitting member to the left and right drive shafts.

3. A differential device according to claim 1; wherein the left and right meshing claws of the power-transmitting member are symmetrical about a widthwise centerline extending generally perpendicular to the rotational centerline of the power-transmitting member; and wherein the left and right meshing claws of the left and right driven members are symmetrical about the widthwise centerline extending generally perpendicular to the rotational centerline of the power-transmitting member.

4. A differential device comprising:

a power-transmitting member mounted to undergo rotation in forward and reverse directions about a central rotational axis and to undergo linear movement in a direction along the central rotational axis, the power-transmitting member having a plurality of meshing claws disposed on opposite side surfaces thereof, each of the meshing claws having an inclined surface disposed at an angle of inclination relative to the central rotational axis of the power-transmitting member;

a pair of driven shafts mounted to undergo rotation about the central axis of the power-transmitting member; and a pair of driven members for rotationally driving, and undergoing axially movement along, the respective driven shafts, the driven members being mounted on the respective driven shafts so that the power-transmitting member is disposed between the driven members, the driven members having a plurality of meshing claws confronting, and for meshing engagement with, the meshing claws disposed on the respective side surfaces of the power-transmitting member so that during rotation of the power-transmitting member, rotational driving power is transmitted from the power-transmitting member to the driven shafts through the driven members, the meshing claws of the driven members having surfaces disposed generally parallel to and contacting the respective inclined surfaces of the meshing claws of the power-transmitting members during meshing engagement;

wherein when the power-transmitting member rotates to transmit rotational driving power to the driven members, force components acting on the contacting surfaces of the meshing claws of the power-transmitting members and the driven members displace the driven members in an axial outward direction away from the power-transmitting member to define therebetween a space to allow axial movement of the power-transmitting member within the space.

5. A differential device according to claim 4; wherein during forward rotation of the power-transmitting member, either a first meshing engagement between the meshing claws of the power-transmitting member on one of the side surfaces thereof and the confronting meshing claws of one of the driven members or a second meshing engagement between the meshing claws of the power-transmitting member on the other of the side surfaces thereof and the confronting meshing claws of the other of the driven members is cancelled when a difference between loads acting on the meshing claws in the first meshing engagement and acting on the meshing claws of the second meshing engagement exceeds a preselected value.

6. A differential device according to claim 5; wherein during reverse rotation of the power-transmitting member, both the first and second meshing engagements between the meshing claws of the power-transmitting member and the driven members are constantly maintained.

7. A differential device according to claim 6; further comprising a claw control mechanism for maintaining the first and second meshing engagements between the meshing claws of the power-transmitting member and the driven members by restricting movement of either or both of the driven members in the axial outward direction away from the power-transmitting member.

8. A differential device according to claim 6; wherein each of the meshing claws of the power-transmitting member and the driven members has an abutting surface extending generally parallel to the central rotational axis of the power-transmitting member so as to allow the first and second meshing engagements between the meshing claws of the power-transmitting member and the driven members to be constantly maintained during reverse rotation of the power-transmitting member.

9. A differential device according to claim 6; wherein when an external force is applied to either of the driven shafts, the driven shafts are subjected to different loads or are rotated at different speeds.

10. A differential device according to claim 4; wherein the meshing claws of the power-transmitting member are symmetrical about a widthwise centerline extending generally perpendicular to the central rotational axis of the power-transmitting member; and wherein the meshing claws of the driven members are symmetrical about the widthwise centerline extending generally perpendicular to the central rotational axis of the power-transmitting member.

* * * * *